United States Patent
Ohshima et al.

(10) Patent No.: US 8,096,651 B2
(45) Date of Patent: Jan. 17, 2012

(54) INK-JET RECORDING METHOD, INK, INK CARTRIDGE, RECORDING APPARATUS, AND RECORDED MATTER

(75) Inventors: Tohru Ohshima, Atsugi (JP); Kiyofumi Nagai, Machida (JP); Naoya Morohoshi, Numazu (JP); Michihiko Namba, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 498 days.

(21) Appl. No.: 12/301,933

(22) PCT Filed: Mar. 17, 2008

(86) PCT No.: PCT/JP2008/055607
§ 371 (c)(1),
(2), (4) Date: Nov. 21, 2008

(87) PCT Pub. No.: WO2008/114884
PCT Pub. Date: Sep. 25, 2008

(65) Prior Publication Data
US 2010/0245416 A1    Sep. 30, 2010

(30) Foreign Application Priority Data
Mar. 19, 2007 (JP) .................................. 2007-071045

(51) Int. Cl.
*B41J 2/01* (2006.01)
(52) U.S. Cl. ........................................ 347/105; 347/101
(58) Field of Classification Search .................. 347/100, 347/95, 96, 101, 105; 106/31.27, 31.6, 31.13; 523/160, 161; 428/32.1, 195
See application file for complete search history.

(56) References Cited

U.S. PATENT DOCUMENTS

| | | |
|---|---|---|
| 2002/0111395 A1 | 8/2002 | Horikoshi et al. |
| 2010/0265292 A1* | 10/2010 | Ohshima et al. .............. 347/100 |

FOREIGN PATENT DOCUMENTS

| | | |
|---|---|---|
| EP | 743193 A1 * | 11/1996 |
| JP | 6 320755 | 11/1994 |
| JP | 11 78225 | 3/1999 |
| JP | 3349803 | 11/2002 |

(Continued)

OTHER PUBLICATIONS

U.S. Appl. No. 12/297,524, filed Oct. 17, 2008, Ohshima, et al.

(Continued)

*Primary Examiner* — Manish S Shah
(74) *Attorney, Agent, or Firm* — Oblon, Spivak, McClelland, Maier & Neustadt, L.L.P.

(57) ABSTRACT

An ink-jet recording method including: printing on a medium by ejecting thereon ink having a pH value of 8 or more and containing at least a particulate colorant, emulsion resin and surfactant, the medium prepared by providing at least a coat layer containing a pigment on at least one surface of a substrate containing cellulose pulp as a main component, wherein printing is performed at a deposited ink amount of 15 $g/m^2$ or less, and wherein the medium has a pH value of 8 or more at a paper surface, and the amount of pure water transferring onto a surface of the medium having the coat layer after a contact time of 100 ms measured with a dynamic scanning absorptometer is 1 $mL/m^2$ or less and the amount of pure water transferring onto the surface of the medium after a contact time of 400 ms is 35 $mL/m^2$ or less.

8 Claims, 13 Drawing Sheets

FOREIGN PATENT DOCUMENTS

| | | |
|---|---|---|
| JP | 2003 80837 | 3/2003 |
| JP | 2005 163017 | 6/2005 |
| JP | 2005 212327 | 8/2005 |
| JP | 2006 70105 | 3/2006 |
| JP | 2006 137072 | 6/2006 |
| JP | 2006 247971 | 9/2006 |
| JP | 2006 281767 | 10/2006 |
| JP | 2006281767 A * | 10/2006 |
| JP | 2006 321978 | 11/2006 |
| JP | 2008 62503 | 3/2008 |
| WO | WO 2007/023987 A1 | 3/2007 |
| WO | WO 2008/114849 A1 | 9/2008 |

OTHER PUBLICATIONS

Supplementary European Search Report issued Nov. 28, 2011 in European Patent Application No. EP20080738851, filed Mar. 17, 2008.

* cited by examiner

INK-JET RECORDING METHOD, INK, INK CARTRIDGE, RECORDING APPARATUS, AND RECORDED MATTER

TECHNICAL FIELD

The present invention relates to an ink-jet recording method capable of recording high-quality images close to those obtained in commercial printing, such as offset printing, by an ink-jet system, and to an ink, an ink cartridge, a recording apparatus, and a recorded mater.

BACKGROUND ART

Ink-jet recording is known as an excellent recording method that is not particularly selective in terms of recording materials (media), and the research and development of recording apparatuses, recording methods, and recording materials have been extensively conducted. Thus, progress in the field of media is particularly significant. From the standpoint of gloss and quality feel, presently available media that has been developed to demonstrate gloss in combination with the increase in absorption rate and absorbed amount of ink are at a level above that of the conventional commercial printing. Media for ink-jet printing can be generally classified into that of a swelling type and that of a porous type, but the media of a porous type that excels in a drying rate of ink has been mainly employed in recent years.

In the mainstream porous-type media, as disclosed in Patent Literatures 1 and 2, an ink absorption layer having pores for taking in the ink is provided on a substrate by using silica or alumina hydrate and, if necessary, a porous gloss layer is provided using colloidal silica or the like. Such specific configuration excels in ink absorbing ability and makes it possible to obtain fine output. Accordingly, it has been advantageously used for consumer photographic applications.

However, the media of this type is very expensive and difficult to manufacture. As a result, the cost thereof is much higher than that of coated paper for general commercial and publishing printing. For this reason, such media has not found significant application in the field of commercial printing where a large output is required to be obtained at a low cost, such as leaflets, catalogues, and pamphlets, regardless of image quality. Significant efforts have heretofore been exerted to reduce the cost of paper, but because a material with a large oil absorption capability (specific surface area) that can maintain high transparency of a layer is usually employed as a filler constituting the ink absorbing layer (receiving layer) of ink-jet media, a special expensive filler such as silica, alumina hydrate, or colloidal silica has to be used, thereby making it very difficult to reduce the cost.

Further, not only in such IJ paper, but also in the media that is made IJ suitable, a cationic additive or a sizing agent is most often used to improve the fixing ability of the colorants and dyes and the pH of the paper surface is brought close to acidic one. Thus, an additive, such as described in Patent Literature 3, is used, cationic fine particles, such as described in Patent Literature 4, are used, and the filler surface is treated with a cationic resin, as described in Patent Literature 5. In most cases, an acidic dye demonstrating anionic properties is used for dye-type ink-jet inks. Because the fixing ability of a dye can be increased by bonding a sulfonic group or the like of an acidic dye with a cationic substance contained in the ink, such technology is presently widely used. Coloring pigments of pigment-type ink-jet inks are also often anionic, and the fixing ability can be improved by the same mechanism. For these reasons, in the case of ink-jet paper, a treatment that decreases the pH of paper surface (shifts it to acidic side) to ensure excellent preservation of ink-jet image is actively conducted, and practically all media designed for ink-jet applications has a pH of the paper surface of 7 or less.

However, inks for commercial printing such as offset printing often employ an oil with a very high boiling point as a solvent and, by contrast with ink-jet inks, the fixation of image after printing is realized by oxidation and polymerization of the solvent.

From the standpoint of fixation, paper with a comparatively fast ink absorption, such as paper for reproduction and copying is preferred. Using a heating roll as a drying aid means for ink-jet printouts is also known, but dye-type oily inks have mainly been suggested, and there are no paper designs for aqueous pigment inks and commercial printing. For example, it has been suggested to improve fixing ability by heating the medium subjected to ink-jet printing from the rear surface to accelerate drying. Drying and fixing can be attained by heating from the rear surface, but with this method the image is not heated directly. As a result, thermal efficiency is very poor in most cases, and although such approach is effective in drying a large amount of moisture contained in the entire media after printing, in most cases it demonstrates practically no effect with respect to a wetting agent (high-boiling solvent) contained in the image. Generally heating at a high temperature of hundred and several tens of degrees is required to dry a high-boiling solvent, the specific temperature depending on the type of the solvent, and such heating is absolutely unacceptable because it causes yellowing and deformation of paper and can burn the paper, as a worst case scenario, and the damage inflicted to the paper cannot be ignored.

In offset printing, fast fixing by drying (oxidation polymerization reaction) is also desired from the standpoint of operability. For this reason, a drying (polymerization) enhancer called "drier" is often added to the ink. Because the drier forms a precipitate of metal ion components under an acidic atmosphere and becomes ineffective, drying ability is known to degrade significantly in the case of paper with a low pH of paper surface such as ink-jet media. In addition, it is well known that wetting water (H water) that is used in offset printing sometimes react with cationic substances of ink-jet media, thereby destroying the hydrophilic-hydrophobic balance of the printing plate and easily causing printing defects such as image contamination. It is also for such technological reasons, rather than only because of cost factors, that the offset printing technology is very difficult to apply to ink-jet media.

Accordingly, an attempt has been made to use an ink-jet ink for printing on a coat paper for commercial printing such as offset printing (Patent Literature 6). However, such paper contains only a small amount of cationic substances that fix dyes, or contain no such substances at all, and the image preservation ability, such as water resistance, after printing is extremely poor, thereby making such paper absolutely unsuitable for practical use.

This is because an SBR latex is generally widely used for the coat layer of a coated paper for commercial printing because of high productivity and low cost thereof. Since the SBR latex uses an anionic emulsifier, it has very poor compatibility with cationic substances such as cationic fixing agents used in ink-jet media. Even if a cationic fixing agent for ink-jet inks is contained in a sufficient amount in a coat paper for printing, the coating liquid is gelled or the SBR emulsion precipitates, thereby making it impossible to obtain the desired printout.

In recent years, ink-jet inks using pigments with excellent water resistance and light resistance surpassing those of dyes as ink colorants have also been employed. Pigments used in such inks are generally identical to those of inks for commercial printing, but such inks are also difficult to use for printing on coated paper for commercial printing that does not take the absorption ability of ink into account. In particular, where high-speed printing is to be performed, bleeding or beading of images occurs and satisfactory images cannot be obtained. Further, it is well known that the images obtained have poor wear resistance, and pigment inks using phthalocyanine blue that has been especially widely used as a cyan colorant are known to be inferior in terms of colorant fixation, specific reasons for such effects being unclear.

For the reasons stated above, it is very difficult to satisfy at the same time the requirements relating to suitability for the conventional offset printing and suitability for ink-jet printing in the field of media for commercial printing having gloss, such as used for catalogues and leaflets, and it is extremely difficult to realize a multipurpose printer suitable for both the offset printing and the ink-jet printing, that is, capable of performing ink-jet printing after offset printing on a coated paper and, conversely; performing offset printing after ink-jet printing.

Patent Literature 7 describes an ink-jet recording ink containing self-dispersible carbon black that has absorbed a water-dispersible polymer compound and is not transmitted in gel filtration chromatography and water, wherein the water-dispersible polymer compound has a gel filtration chromatography transmission ratio equal to or less than 20% when this compound is in a state free from carbon black. Further, the paper recording media in this publication is classified into "usual paper" and "glossy coat paper", and the "glossy coat paper" is further classified into "semi-glossy paper" and "glossy paper", and the ink is disclosed to be capable of forming glossy recording images on the "usual paper" that is a medium other than the "glossy coat paper". However, the ink of Patent Literature 7 is not particularly suitable for "semi-glossy paper", and the technology described in Patent Literature 7 cannot be considered as a printing method suitable therefor.

[Patent Literature 1] Japanese Patent Application Laid-Open (JP-A) No. 2005-212327
[Patent Literature 2] JP-A No. 11-078225
[Patent Literature 3] Japanese Patent (JP-B) No. 3349803
[Patent Literature 4] JP-A No. 2003-80837
[Patent Literature 5] JP-A No. 2006-321978
[Patent Literature 6] JP-A No. 06-320755
[Patent Literature 7] JP-A No. 2005-163017

DISCLOSURE OF INVENTION

With the foregoing in view, the present invention has been created to attain the below-described object. Thus, it is an object of the invention to provide a perfect ink-jet recording method that is adaptable to a wide variety of paper types, in particular suitable for full-color printing on paper for commercial printing, has low cost, demonstrates high printing quality, can print rapidly and easily the printouts of quality close to that of commercial printouts, and ensures excellent wear resistance of printouts, and also to provide an ink, an ink cartridge, a recording apparatus, and a recorded matter.

Means for attaining this object are described below.

<1> An ink-jet recording method including: printing on a medium by ejecting thereon an ink that has a pH value of 8 or more and that contains at least a particulate colorant, an emulsion resin and a surfactant, the medium prepared by providing at least a coat layer containing a pigment on at least one surface of a substrate containing cellulose pulp as a main component, wherein printing is performed at a deposited ink amount of equal to or less than 15 $g/m^2$, and wherein the medium has a pH value of 8 or more at a paper surface, and the amount of pure water transferring onto a surface of the medium having the coat layer after a contact time of 100 ms as measured with a dynamic scanning absorptometer is equal to or less than 30 $mL/m^2$ and the amount of pure water transferring onto the surface of the medium having the coat layer after a contact time of 400 ms as measured with the dynamic scanning absorptometer is equal to or less than 35 $mL/m^2$.

<2> The ink-jet recording method according to <1>, wherein at least phthalocyanine blue is used as the particulate colorant.

<3> The ink-jet recording method according to any of <1> and <2>, wherein the amount of pure water transferring onto the surface of the medium after a contact time of 100 ms is equal to or less than 1 $mL/m^2$.

<4> The ink-jet recording method according to any of <1> to <3>, wherein the coat layer of the medium contains at least an SBR emulsion.

<5> An ink for use in the ink-jet recording method according to any of <1> to <4>, wherein the ink comprising at least water, a colorant, and a wetting agent.

<6> The ink according to <5>, further comprising a surfactant, wherein the surfactant is a fluorine surfactant.

<7> The ink according to any of according to any of <5> and <6>, wherein a viscosity of the ink at 25° C. is 1 cps to 30 cps.

<8> An ink cartridge filled with the ink according to any of <5> to <7>.

<9> The recording method according to any of <1> to <4> wherein the method uses a recording apparatus in which an ink repellent layer is formed on a surface of an ink-jet head where openings for ink ejection are formed.

<10> A recording apparatus using the recording method according to <9>

<11> A recorded matter recorded by the recording method according to any of <1> to <4>.

Figure 1:
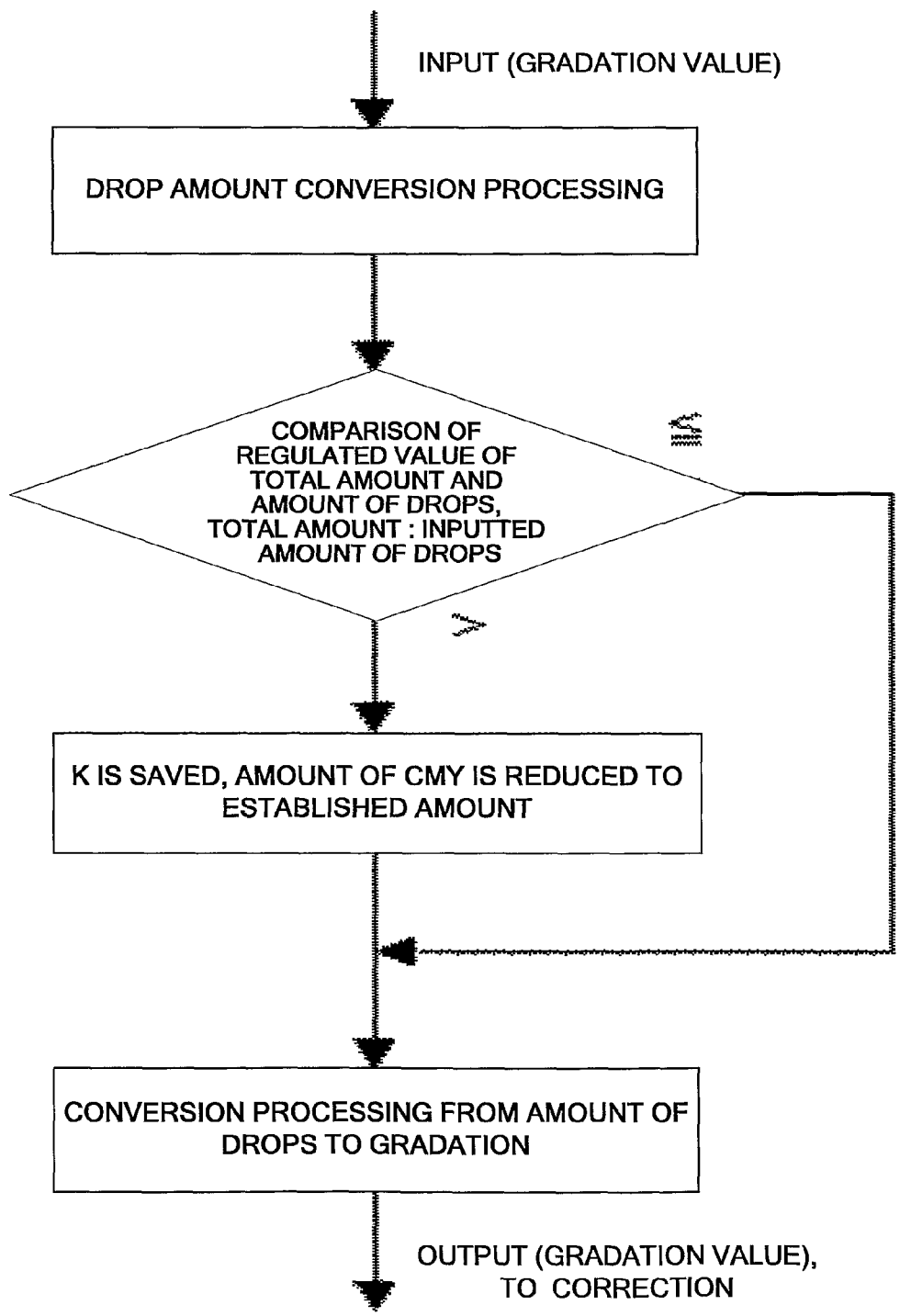
FIG. 1 is a flowchart illustrating the flow of total amount control processing in accordance with the invention.

As will be specifically described in detail hereinbelow, a very significant effect of the invention is that it can provide a high-speed, low-cost, and highly reliable recording method ensuring good quality of printouts when ink-jet recording is performed.

BEST MODE FOR CARRYING OUT THE INVENTION

The ink-jet recording method in accordance with the invention will be described below in grater detail.

The inventors have conducted a comprehensive study of ink-jet recording methods that are suitable for low-cost, high-speed recording of images with high reliability. As a result, an image forming method has been invented that is based on a new design concept, excels in on-demand ability, and makes it possible to form images at a low cost by using a pigment ink containing a special resin and having high permeability into media that has poor ink-jet ink permeability and a pH value of paper surface within a predetermined range.

The ink in accordance with the invention has been invented for application to media with poor ink absorption ability. The ink has a surface tension lower than that of the usual ink-jet ink and, therefore, excels in wetting ability, the carrier has high permeation ability with respect to media with small pores, and the ink viscosity increases significantly with the permeation of even very small amounts of the carrier. As a result, the adjacent dots hardly merge together after colliding with the surface and dots can be formed in a stable manner even on media with very poor ink permeation ability in which the adjacent dots simply merge together. Further, because a colorant remains on the surface and practically does not permeate into the media, it is not that necessary to place the droplets on the same address, and sufficient color and image density can be obtained with a very small total amount of ink.

Because an image is formed with a total amount of ink that is greatly decreased with respect to that of the conventional inks, the amount of carrier that has to permeate into the media is decreased, curling and cockling are practically eliminated, and the rigidity of paper after printing is almost equal to that before the printing. As a result, printing can be performed without damaging the substrate even on the media for which the absorption of ink has not been considered, such as paper for commercial printing.

Where the absorption of carrier ends after an ink droplet has been placed on the media surface, the colorant sets in a state in which a very small amount of wetting agent is contained. This is almost identical to the state obtained immediately after offset printing performed with an ink using soybean oil. At this time, in order to attain homogeneous mixing of the colorant and bonding agent component remaining on the surface, induce sufficient leveling, obtain a smooth surface, and realize other most desirable features, it is necessary that resin or white pigment constituting the medium present at the outermost surface of the medium and the colorant pigment or bonding agent that are solid components of the ink be bonded strongly to each other.

In accordance with the invention, it has been made clear that the bonding strength increases with the increase in pH of paper surface. The mechanism of such increase is unclear, but apparently if the paper surface is acidic (excess in cations), then bonding rapidly and preferentially occurs between the constituent materials of paper surface and alkali components, such as a pH adjuster, contained in the ink, and the anchor effect (fastener effect) of the colorant contained in the ink or the resin contained in the ink with the paper surface that is discussed in the so-called adhesion theory becomes insufficient. Another apparent reason is that ink aggregation proceeds at a high rate under the effect of cationic substances contained in the paper and sufficient level cannot be attained. In the case of ink-jet media that has sufficient ability to absorb ink, the colorant itself is incorporated in the media, thereby making in unnecessary to provide for a special anchor effect between the media and colorant, but in the image forming method in accordance with the invention, the anchor effect of the resin or pigment at the media surface is very important because it produces a significant effect on fixing ability of the colorant.

In accordance with the invention, from the standpoint of anchor effect and leveling of ink components, contrary to the general knowledge in the field of ink-jet media, slower ink absorption acts favorably upon fixing and can increase the fixing strength of cyan.

<Media Conditions>

First, whether a medium is adequate as a medium in accordance with the invention, can be determined by a transfer quantity of pure water measured with a dynamic scanning liquid absorptometer. Thus, the amount of pure water transferred onto the recording medium after a contact time of 100 ms measured with a dynamic scanning absorptometer is equal to or less than 30 mL/m$^2$, and the amount of pure water transferred onto the recording medium after a contact time of 400 ms is equal to or less than 35 mL/m$^2$. Preferably, the amount of pure water transferred onto the recording medium after a contact time of 100 ms measured with a dynamic scanning absorptometer is equal to or less than 1 mL/m$^2$. A coat layer on the medium satisfying this condition is assumed to have a function of the coat layer in accordance with the invention and makes it possible to obtain a recorded image with high optical density (OD) that is free from blurring, feathering, and bleeding at the peripheral portion of symbols and images and has the so-called "clear-cut edges". Where the absorption of water is higher than indicated above, the colorant can ooze into the layer or substrate, the colorant is hidden by the pigment in the coat layer, and a high-density image cannot be obtained.

Such coat layer of the recording media in accordance with the invention contains a pigment and generally also contains a resin binder and is configured to have them as the main components, but the adjustment in the direction of decreasing the transfer quantity can be made by increasing the compounded quantity of the resin, and the adjustment in the direction of increasing the transferred amount can be made by increasing the compounded quantity of the pigment. Further, the transferred amount can be also increased by increasing the specific surface area of pigment particles constituting the coat layer, for example, by using a pigment of a kind with a small particle size or a large specific surface area.

Secondly, the pH value of the surface is measured and the pH value has to be equal to or more than 8. A measurement method using J. TAPPI No. 49-2 or a test paper is known as a method for measuring the surface pH, but a method using a pH meter of a contact electrode system is simpler to use. A water drop of a volume of 0.1 mL is dropped on a medium surface that is the measurement object, an electrode is pressed against it, and a stable numerical value after 30 sec is taken is a pH value of paper surface. A ScanCheck manufactured by Hanna instruments Co., Ltd. is suitable as a pH meter that can be used in such method.

The first function necessary for the image forming method in accordance with the invention and the coat layer of the invention is to separate the pigment and solvent contained in the ink and cause only the solvent to permeate into the substrate. For this purpose, it is preferred that the coat layer have a fine structure such that contains pores. When absolutely no fine structure is present in the coat layer, permeation of the solvent component of the ink is delayed. Therefore a state in which the ink is not dried is easily encountered. However, if the amount of fine structure is too larger, the function of separating the colorant contained in the ink is degraded, the image density is decreased, and the colorant pigment present on the medium surface after printing migrates into the medium with the passage of time, thereby causing discoloration. Secondly, a high pH value is necessary to form a smooth surface and ensure homogeneous distribution of the colorant and resin binder, from among the ink components, remaining on the surface. Where such conditions are satisfied, both the paper for commercial printing and the paper for publishing printing can be used.

In the recording medium, the amount of the ink in accordance with the invention transferred into the recording medium after a contact time of 100 ms as measured with a dynamic scanning absorptometer is 2 mL/m$^2$ to 40 mL/m$^2$, preferably 3 mL/m$^2$ to 30 mL/m$^2$. Further, the amount of pure water transferred onto the recording medium is preferably 1 mL/m$^2$ to 30 mL/m$^2$, more preferably 1 mL/m$^2$ to 10 mL/m$^2$.

Where the amount of the ink or pure water transferred after a contact time of 100 ms is too small, beading sometimes easily occurs, and where the transferred amount is too high, the diameter of ink dots after recording can become smaller than the desired diameter.

The amount of the ink in accordance with the invention transferred into the recording medium after a contact time of 400 ms measured with a dynamic scanning absorptometer is 3 mL/m$^2$ to 50 mL/m$^2$, preferably 4 mL/m$^2$ to 40 mL/m$^2$.

Further, the amount of pure water transferred onto the recording medium is preferably 2 mL/m$^2$ to 35 mL/m$^2$, more preferably 2 mL/m$^2$ to 11 mL/m$^2$.

Where the amount of ink or pure water transferred after a contact time of 400 ms is too small, drying ability is insufficient. As a result, spur-like defects sometimes easily occur. Where the transferred amount is too high, bleeding easily occurs and the gloss of the image portion after drying sometimes easily decreases.

Here, the dynamic scanning absorptometer (DSA, Shipa Gikyoshi, Vol. 48, May 1994, pp. 88-92, Kuga Shigenori) is a device that can accurately measure the amount of absorbed liquid within a very short interval. The dynamic scanning absorptometer performs automated measurements by a method comprising the steps of directly reading the rate of liquid absorption from the movement of a meniscus in a capillary tube, producing a disk-like sample, spirally scanning an absorption head above the sample, automatically changing the scanning rate according to a preset pattern, and performing measurements in a number of steps necessary for one sample. The head for supplying the liquid to the paper sample is connected to the capillary tube via a Teflon® tube, and the position of the meniscus in the capillary tube is automatically read with an optical sensor. More specifically, the amount of transferred water and ink was measured by using the dynamic scanning absorptometer (D type, K350 series, manufactured by Kyowa Seiko Kabushiki Kaisha). The transferred amounts after a contact time of 100 ms and a contact time of 400 ms can be respectively obtained by interpolation from the values of the transferred amounts measured within contact intervals close to each contact time. The measurements were carried out at 23° C. and 50% RH.

<Deposited Ink Amount>

In accordance with the invention, in order to prevent the colorant contained in the ink from oozing, distribute it efficiently in the vicinity of the medium surface, and ensure drying ability of the ink, it is necessary to limit stringently the total amount of ink. The total amount of ink is an important parameter when an image is formed and represents the amount of ink per unit surface area where a solid image of a highest density is formed. In accordance with the invention, by regulating the total amount of ink it is possible to form a uniform image with small beading or bleeding even on media with poor ink absorption ability. Conversely, where the ink is used in an amount above this limit, that is, as in the conventional ink-jet recording process, the colorant separation ability of the coat layer is not followed, the colorant pigment of the ink permeates together with the ink solvent, and the permeation of the solvent component of the ink greatly hinders the image formation process. As a result, a high-quality image cannot be obtained.

More specifically, when the ink in accordance with the invention is used, the maximum deposited ink amount during image formation (regulated value of the total amount of ink) is preferably 15 g/m$^2$, and when an image is formed with the deposited ink amount that is equal to or less than this value, the image of very high quality that is free from beading and bleeding can be obtained. It was found that deposited ink amount equal to or less than 12 g/m$^2$ is even more preferred.

This can be explained as follows. By contrast with the conventional combinations of dye inks and special media for ink-jet printing, in the case of the pigment ink and media in accordance with the invention, the colorant is present in the form of a deposit on the medium surface, and when the colorant is used in an amount necessary to cover the medium surface, the colorant in excess of this amount is wasted. Moreover, even when the high-permeation ink in accordance with the invention is used, the extra ink solvent interferes with the adjacent dots, causing beading and bleeding.

In particular, where the regulated value of the total amount of ink is set high, as in the conventional ink-jet recording, even if the ink in accordance with the invention is employed, a large amount of ink is used in solid portions and shadow portion, the colorant separation ability of the medium is exceeded, the image bleeds and drying ability is greatly degraded.

The total amount of ink to be used for image formation in accordance with the invention can be sufficiently small by comparison with that of the conventional ink-jet printing method, even when a high image density is required, and by contrast with the conventional ink-jet media, where the ink absorption ability of the medium itself is low, the colorant easier spreads uniformly over the medium surface. In other words, because the ink is spread thinly over the medium surface, even if the ink absorption ability is low, the ink can be readily dried and the occurrence of bleeding and beading is prevented.

Further, the permeation of carrier can be easily adjusted by the amount of permeation agent (EHD) and also the amount of fluorine surfactant FS300 that is added. Furthermore, by decreasing the total amount of ink necessary for printing, the capacity of the ink cartridge can be reduced by comparison with that of the conventional ink cartridge, and the device can be reduced in size. Where the cartridge size is the same as in the conventional systems, the replacement frequency of the ink cartridge can be reduced and printing can be performed at a lower cost.

Basically, the smaller is the total amount of ink, the better pigment separation ability of the coat layer is demonstrated, but if the total amount of ink is too small, a side effect is produced, that is, the image dot diameter after printing becomes too small. Therefore, it is desirable that the total amount of ink be set (regulated) within this range according to the target image.

<Regulating the Total Amount>

A processing of "regulating the total amount" will be described below.

Figure 14:
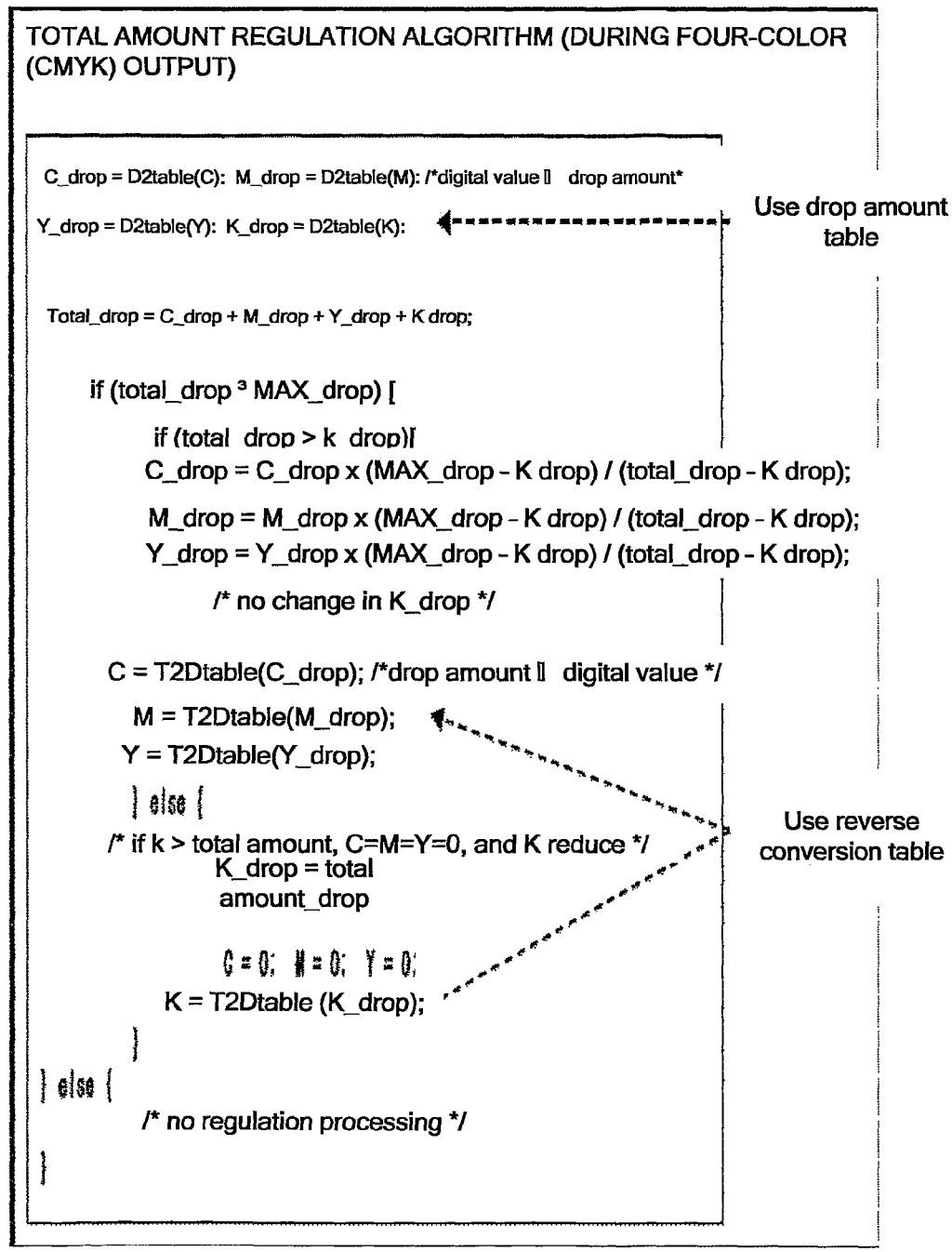
FIG. 14 illustrates a specific example (algorithm) of total amount control processing shown in FIG. 1.

A specific example (algorithm) of processing shown in FIG. 1 is shown in FIG. 14. The present specific example serves to facilitate the understanding of the invention and places no limitation on the invention.

The processing of regulating the total amount is performed as shown in FIG. 1. The regulated value of the total amount as shown herein is the amount of ink droplets found from the results of evaluation performed to prevent the effects occurring when deposited ink amount is too high, for example, ink beading, rubbing or transfer caused by decrease in cockling resistance, and clogging of the paper. The specific example of the processing shown in FIG. 1 will be explained below in greater detail, but the present specific example serves to facilitate the understanding of the invention and places no limitation on the invention.

The regulation specification of the regulated value of the total amount can be represented, for example, in a 600×600 dpi, 100×100 mask size (units: pl).

The amount of drops of the same order as the regulated value of the total amount in the usual paper and about 55% the regulated value of the total amount in a silky glossy paper that has been determined by tests conducted by the authors is suitable as a regulated value of the total amount in the case printing in accordance with the invention is performed on the recording medium. Further, there are cases in which the amount of drops obtained from the input values is larger than the regulated value of the total amount, as an object to which the processing of regulating the total amount is actually applied, and in such cases, the processing of suppressing the amount of drops to a level equal to or less than the regulated value of the total amount is performed by decreasing the amount of ink drops of CMY colors, while maintaining the amount of drops of Bk ink. The disposition order of the unit for regulating the total amount and the γ table can be reversed.

In accordance with the invention, the total amount of ink was measured by a weight method. More specifically, a rectangular solid image of 5 cm×20 cm was printed at a maximum concentration, on a superfine special paper (manufactured by Epson Corp.) that is a special paper for ink-jet printing, the weight was measured immediately after the printing, the weight before the printing was subtracted therefor, and the value obtained was multiplied by 100 to obtain the total amount of ink.

<Ink Fixing Agent>

As one more condition relating to the pigment ink in accordance with the invention, it is desirable that a resin component that enhances the fixation of the colorant pigment be contained in the ink. The resin component that enhances the fixation is a component that maintains the bonding strength between the colorant pigment and the medium surface or between the particles of the colorant pigment above a predetermined level. Where such resin component is absent, the colorant pigment peels off after printing. The fixing component may be contained independently in the ink or may be adsorbed and chemically bonded to the surface of colorant particles. A low-molecular or water-soluble resin may be used as the fixing agent, but a resin emulsion is preferred.

<Surface Tension of Ink>

As one more necessary condition relating to the pigment ink in accordance with the invention, it is preferred that the ink have a very high permeation ability, and a surface tension equal to or less than 40 mN/m was found to be preferred to meet this condition. Where the surface tension is more than 40 mN/m, the permeation of ink is delayed and an image oozing phenomenon is demonstrated, thereby making it impossible to obtain a high-grade image. The lower is the surface tension, the higher is the separation ability of the pigment and solvent. Therefore, a lower surface tension is preferred. The surface tension of ink can be adjusted by the amount of permeation agent (EHD) and the amount of fluorine surfactant FS300 added to the ink.

The ink with ultrahigh permeation in accordance with the invention can be also printed on the conventional porous special media for ink-jet printing. However, because the ink absorption rate is much higher than in the case of printing on the recording medium in accordance with the invention, after the ink droplets collide with the medium surface, the solvent permeates into the medium before the dots wet the surface and spread, thereby decreasing the dot diameter. As a result, the concentration easily decreases and graininess increases. Therefore, in order to product a high-grade image, it is necessary to perform printing by increasing resolution over than the recording medium in accordance with the invention. As a consequence, the printing rate decreases and the consumption of ink increases. Therefore, it is desirable that the recording media in accordance with the invention be used.

The surface tension of the ink at 25° C. is preferably equal to or less than 30 mN/m, more preferably 15 mN/m to 40 mN/m. Where the surface tension is less than 15 mN/m, the nozzle plate in accordance with the invention is excessively wetted and ink droplets cannot be properly formed (atomized), oozing on the recording medium in accordance with the invention is significant and stable discharge of ink sometimes cannot be attained. Where the surface tension is more than 40 mN/m, sometimes the permeation of ink into the recording medium is insufficient, beading occurs, and the drying time is extended.

The surface tension of an ink is measured, for example, with a surface tensiometer (for example, CBVP-Z of Kyowa Interface Science Co., Ltd.) with a platinum plate at a temperature of 25° C.

<Solids in Ink>

The solid content of the ink in accordance with the invention is preferably equal to or more than 3 mass %. Where the concentration is lower than this level, the increase in viscosity during drying is slow and the image tends to bleed easily. The higher is the content of solids the better, but if it is too high, nozzle clogging is significant and loss of image easily occur. Therefore, it is desirable that the content of solids be 5 mass % to 15 mass %.

[Media Coat Layer]

—Coat Layer—

The coat layer contains a pigment and a binder and, if necessary, a surfactant and other components.

An inorganic pigment or a combination of an inorganic pigment and an organic pigment can be used as the pigment.

Examples of suitable inorganic pigments include kaolin, talc, calcium bicarbonate, calcium carbonate, calcium sulfite, amorphous silica, titanium white, magnesium carbonate, titanium dioxide, aluminum hydroxide, calcium hydroxide, magnesium hydroxide, zinc hydroxide, and chromite. Among them, kaolin is particularly preferred because it excels in gloss developing ability producing a surface close to that of paper for offset printing.

The kaolin can be delaminated kaolin, calcined kaolin, and engineered kaolin obtained by surface modification. From the standpoint of gloss developing ability, it is preferred that kaolin having a particle size distribution such that the proportion of particles with a diameter of 2 μm or less is equal to or more than 80 mass % makes up 50 mass % or more of the entire kaolin.

The amount of kaolin added is preferably equal to or more than 50 parts by mass per 100 parts by mass of the entire pigment of the coat layer. Where the amount of kaolin added is less than 50 parts by mass, a sufficient effect in terms of gloss sometimes cannot be obtained. No particular upper limit is set for the amount added, but taking into account the flowability of kaolin, in particular thickening under a high shear force, from the standpoint of suitability for coating, it is preferred that the amount added be equal to or less than 90 parts by mass.

Examples of suitable organic pigments include water-soluble dispersions of styrene-acryl copolymer particles, styrene-butadiene copolymer particles, polystyrene particles and polyethylene particles. These organic pigments may be used in mixtures of two or more thereof.

The amount of the organic pigment added is preferably 2 parts by mass to 20 parts by mass per 100 parts by mass of the entire pigment of the coat layer. Because the organic pigments excel in gloss developing ability and the specific gravity thereof is less than that of inorganic pigment, a coat layer of a high bulk, high gloss, and good surface coatability can be obtained. Where the amount of the organic pigment added is less than 2 parts by mass, the above-described effect is not obtained, and where the amount added is more than 20 parts by mass, flowability of the coating liquid is degraded, leading to decreased coating operability. This is also ineffective in terms of cost.

Organic pigments can have a dense solid form, hollow form, or donut-like form, but from the standpoint of the balance of gloss developing ability, surface coatability, and flowability of the coating liquid, a hollow pigment, preferably with a mean particle size of 0.2 μm to 3.0 μm, more preferably with a void ratio equal to or higher than 40% is employed.

Examples of suitable inorganic pigments of the coat layer of the media used in accordance with the invention include magnesium carbonate, talc, kaolin, illite, clays, calcium carbonate, calcium sulfite, titanium white, magnesium carbonate, and titanium dioxide. Of these pigments, those that have as high a refractive index as possible are preferably used because the thickness of the coat layer can be reduced. However, from the standpoint of cost, it is preferred that calcium carbonate or kaolin be used. These pigments can be used together, provided that the effect of the invention is not lost. Further, they can be also used together with other pigments that are not listed above.

Kaolin is preferred because of excellent gloss developing ability producing a surface similar to that of offset printing. The kaolin can be delaminated kaolin, calcined kaolin, and engineered kaolin obtained by surface modification. From the standpoint of gloss developing ability, it is preferred that kaolin having a particle size distribution such that the ratio of particles with a diameter of 2 μm or less is equal to or more than 80 mass % makes up 50 mass % or more of the entire kaolin. The compounded amount of kaolin is preferably equal to or more than 50 parts by mass. Where this amount is less than 50 parts by mass, a sufficient effect in terms of gloss is difficult to expect.

No particular upper limit is set for the amount added, but taking into account the flowability of kaolin, in particular thickening under a high shear force, from the standpoint of suitability for coating, it is preferred that the amount added be less than 90 parts by mass.

These pigments with a high refractive index may be also used together with an organic pigment or silica having a low refractive index. Examples of suitable organic pigments include water-soluble dispersions such as styrene-acryl copolymer particles, styrene-butadiene copolymer particles, polystyrene particles and polyethylene particles. Those organic pigments may be used in combinations of two or more thereof because organic pigments excel in gloss developing ability and have a specific gravity lower than that of inorganic pigments, it is possible to obtain a coat layer of a high bulk, high gloss, and good surface covering ability. When the amount of organic pigment is less than 2 parts by mass, the above-described effect is not produced, and when the amount is more than 5 parts by mass, the organic pigment easily penetrates to the rear side. Moreover, such a high amount of organic pigment is cost ineffective. Organic pigments can have a dense solid shape, a hollow shape, and a donut-like shape. With consideration for the balance of gloss developing ability, surface covering ability, and flowability of the coating liquid, it is desirable that the average particle size of the organic pigment be within a range of from 0.2 μM to 3.0 μm, and it is more preferred that hollow particles with a void ratio of 40% or more be employed.

<Materials Constituting the Coat Layer: Binder>

The binder of the colorant pigment coat layer employed in accordance with the invention is not particularly limited, provided that it is an aqueous resin emulsion that has a high adhesion force with the pigment constituting the coat layer and the base paper and causes not blocking.

Examples of suitable aqueous binders include poly(vinyl alcohol) or starches such as oxidized starch, esterified starch, ferment-modified starch, and cationized starch, casein, soybean proteins, carboxymethyl cellulose, hydroxyethyl cellulose and other fibrous derivatives, styrene-acryl resin, isobutylene-maleic anhydride resin, acrylic emulsion, vinyl acetate emulsion, vinylidene chloride emulsion, polyester emulsions, styrene-butadiene latex, and acryl nitride butadiene latex. Among them, starch and styrene-butadiene latex are preferred from the standpoint of cost. The styrene-butadiene latex may be a copolymer latex that is generally employed for coating on paper, such latex being obtained by copolymerization of styrene and butadiene as monomers and, if necessary, other monomers, or by modifying a copolymer by a chemical reaction. Examples of suitable other monomers include acrylic acid, methacrylic acid, and alkyl esters of acrylic acid and methacrylic acid, acrylonitrile, maleic acid, phthalic acid, and vinyl monomers such as vinyl acetate. Crosslinking agents such as methylolated melamine, methylolated urea, methylolated hydroxypropylene urea, and isocyanates may be also contained, and compositions having self-crosslinking ability that are copolymers containing units such as N-methylol acrylamide may be also used. These may be used individually or in combinations of two or more thereof.

The added amount of the aqueous binder in the coat layer employed in accordance with the invention is preferably 50 mass % to 70 mass %, more preferably 55 mass % to 60 mass % of the total content of solids in the coat layer. Where the usage ratio is below these ranges, the adhesion force is insufficient and the decrease in strength of the ink-receiving layer and the decrease in the internal bonding strength causing particles to fall out cause concerns.

If necessary, other components can be added to the coat layer in accordance with the invention within a range in which the object of the invention can be attained and the effect thereof is not lost. Examples of such other components include various aids compounded with usual pigments for coated paper, such as dispersants, thickening agents, water-retaining agents, antifoaming agents, and waterproofing agents, and also additives such as pH adjusters, preservatives, antioxidants, and cationic organic compounds.

Surfactants employed in the coat layer are not particularly limited and can be appropriately selected according to the object. Anionic surfactants, cationic surfactants, amphoteric surfactants, and nonionic surfactants can be used. Among them, nonionic surfactants are especially preferred. Adding the surfactants makes it possible to improve water resistance of images and also increase the image density and prevent bleeding.

Examples of nonionic surfactants include adducts of higher alcohols and ethylene oxide, ethylene oxide adducts or alkyl phenols, ethylene oxide adducts of fatty acids, ethylene oxide adducts of polyhydric alcohol fatty acid esters, ethylene oxide adducts of higher aliphatic amines, ethylene oxide adducts of fatty acid amides, ethylene oxide adducts of oils and fats, adduct of polypropylene glycol and ethylene oxide, fatty acid esters of glycerol, fatty acid esters of pentaerythritol, fatty acid esters of sorbitol and sorbitan, fatty acid esters of cane sugar, alkyl ethers of polyhydric alcohols, and fatty acid amides of alkanolamines. These surfactants may be used individually of in combinations of two or more thereof.

The polyhydric alcohols are not particularly limited and can be appropriately selected according to the object. Examples of suitable polyhydric alcohols include glycerol, trimethylolpropane, pentaerythritol, sorbitol, and cane sugar. As for the ethylene oxide adducts, compounds in which ethylene oxide is partially substituted with an alkylene oxide such as propylene oxide or butylene oxide can be also used effectively. The substitution ratio is preferably 50% or less. The HLB (hydrophilic-lipophilic balance) of the nonionic surfactant is preferably 4 to 15, more preferably 7 to 13.

The amount of surfactant added is preferably 0 part by mass to 10 parts by mass, more preferably 0.1 parts by mass to 1.0 part by mass per 100 parts by mass of the cationic organic compound.

If necessary, other components can be added to the coat layer in accordance with the invention within a range in which the object of the invention can be attained and the effect thereof is not lost. Examples of such other components include additives such as an alumina powder, pH adjusters, preservatives, and antioxidants.

Further, in case of the invention, it is not always necessary to add the cationic organic compound. Conversely, where the amount added is too high, the pH of the paper surface most often decreases. However, a minimum necessary amount of the cationic organic compound can be used according to the object.

Examples of suitable cationic organic compounds include a dimethylamine-epichlorohydrin polycondensate, a dimethylamine-ammonia-epichlorohydrin polycondensate, a poly(trimethylamine ethyl methacrylate-methyl sulfate), diallylamine hydrochloride-acrylamide copolymer, poly(diallylamine hydrochloride-sulfur dioxide), polyallylamine hydrochloride, poly(allylamine hydrochloride-diallylamine hydrochloride), acrylamide-diallylamine copolymer, polyvinylamine copolymer, dicyandiamide, dicyandiamide-ammonium chloride-urea-formaldehyde condensate, polyalkylene polyamine-dicyandiamide ammonium salt condensate, dimethyl diallyl ammonium chloride, polydiallyl methyl amine hydrochloride, poly(diallyldimethyl ammonium chloride), poly(diallyldimethyl ammonium chloride-sulfur dioxide), poly(diallyldimethyl ammonium chloride-diallylamine hydrochloride derivative), acrylamide-diallylamine hydrochloride copolymer, acrylic acid salt-acrylamide-diallylamine hydrochloride copolymer, polyethyleneimine, ethyleneimine derivatives such as acrylamine polymer, and modified polyethyleneimine alkylene oxide. These surfactants may be used individually or in combinations of two or more thereof.

<Substrate: Paper>

Chemical pulp, mechanical pulp, and old paper recycled pulp can be mixed at any ratio for use as a substrate to be employed in accordance with the invention. If necessary, a starting material having optionally added thereto an internal sizing agent, a yield increasing agent, and a paper strength enhancing agent is formed with a long-net former, a gap-type twin-wire former, and a hybrid former in which the rear half portion of a long net section is configured of twin wires.

The pulp for use in the substrate in accordance with the invention may contain a virgin chemical pulp (CP), for example, virgin chemical pulp obtained by chemically processing wood materials and other fibrous starting materials, such as leaf bleached Kraft pulp, needle bleached Kraft pulp, leaf unbleached Kraft pulp, needle unbleached Kraft pulp, leaf unbleached sulfite pulp, and needle unbleached sulfite pulp, and virgin mechanical pulp (MP), for example, virgin mechanical pulp obtained by mechanically processing wood materials and other fibrous starting materials, such as ground pulp, chemiground pulp, chemimechanical pulp, and semi-chemical pulp.

Recycled paper pulp may be also used. Examples of the starting materials for the recycled paper pulp include those described in the list of standard qualities of recycled paper of the Paper Recycling Promotion Center, for example, high-quality white paper, ruled white paper, creamy white paper cards, special white paper, medium-quality white paper, flyleaf shaving paper, fair paper, Kent paper, white art paper, finest cut paper, special cut paper, newspaper, magazine paper. Specific examples include OA recycled paper such as non-coated computer paper, which is information-related paper, paper for printers, e.g., heat-sensitive paper and pressure-sensitive paper, and PPC recording paper, and waste paper of paper or boards, e.g., coated paper such as art paper, coated paper, slightly coated paper, and matte papers, and non-coated paper such as high-grade paper, color high-grade paper, notebook paper, letter paper, packing paper, fancy paper, medium-grade paper, newspaper, groundwood paper, supercalendered paper, flyleaf shaving paper, pure white rolled paper, and milk cartons, and this waste paper is chemical pulp paper and high-yield pulp-containing papers. These kinds of paper may be used individually or in combinations of two or more thereof.

The recycled pulp is typically manufactured by a process involving the following four steps.

(1) A defibrating step of breaking down used paper into fibers and separating ink from the fibers by using a mechanical force and a reagent in a pulper.

(2) A dust removing step of removing foreign matter (such as plastic) and dust contained in the recycled paper by using, for example, a screen and a cleaner.

(3) A deinking step of removing the ink that has separated by a surfactant from the fibers to the outside of the system by using a flotation method or a cleaning method.

(4) A bleaching step of bleaching the fibers by oxidization action or reduction action.

When mixing the recycled paper pulps, the mixing ratio of the recycled paper pulp in the entire pulp is preferably 40% or lower so as to prevent curling after recording.

As a filler for the substrate in accordance with the invention, calcium carbonate is effective, but inorganic pigments, e.g., silicates such as kaolin, calcined clay, pyrophillite, sericite, and talc, or organic pigments such as satin white, barium sulfate, calcium sulfate, zinc sulfide, plastic segments and urea resin can be also used.

No specific limitation is placed on the internal sizing agent used in the substrate in accordance with the invention, and well-known internal sizing agents that have been used in paper of ink-jet printing and paper for commercial printing can be appropriately selected and used. Examples thereof include sizing agents of a rosin emulsion system. In order to increase the pH value of paper surface, it is preferred that neutral rosin sizing agents, alkenyl succinic anhydride (ASA), alkenyl ketene dimmer (AKD), petroleum resin sizing agents that are used in neutral papermaking process are preferred. Among them, neutral rosin sizing agents and alkenyl succinic anhydride are especially preferred.

The amount of the internal sizing agent used is preferably 0.1 part by mass to 0.7 part by mass per 100 parts by mass of a completely dry pulp, but this range is not limiting.

A well-known conventional pigment can be used, for example, as a white pigment serving as an internal filler for use in the substrate. Examples of suitable white pigments include white inorganic pigments such as lightweight calcium carbonate, heavy calcium carbonate, kaolin, clay, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic silica, aluminum hydroxide, alumina, lithopone, zeolite, magnesium carbonate, and magnesium hydroxide, and organic pigments such as styrene-based plastic pigments, acryl-based plastic segments, polyethylene, microcapsules, urea resin, and melamine resin. These compounds may be used individually or in combinations of two or more thereof.

—Manufacture of Coat Layer—

Methods for providing a coat layer by a coating process on the substrate in accordance with the invention are not particularly limited, and a method employing direct coating, a method by which a layer coated on another substrate is transferred on the source paper, and an atomizing method such as spraying can be used. Examples of methods employing direction coating include a roll coater method, an air knife coater method, a gate roll coater method, a size press method, a seam sizer method, a rod metal size press coater and other film transfer systems, or a blade coater system using a fountain or roll application.

Among them, from the standpoint of cost efficiency, the preferred method involves impregnation or adhesion at a conventional sizer press, a gate roll sizer press, or a film transfer size press installed at a papermaking machine, followed by on-machine finishing.

The amount of adhered coat layer liquid is not particularly limited and can be appropriately selected according to the object, but it is preferred that the amount of solids be 0.5 g/m$^2$ to 20 g/m$^2$. Where this amount is less than 0.5 g/m$^2$, the ink colorant component cannot be sufficiently separated. As a result, the colorant permeates into the paper causing decrease in concentration or bleeding of symbols. Drying may be performed, if necessary, after impregnation or coating. No particular limitation is placed on the drying temperature in this case and it can be selected appropriately according to the object. The preferred temperature is about 100° C. to 250° C.

The drying treatment of the coat layer can be performed, for example, by using a hot-blow drying furnace or a hot drum. Further, surface finishing may be performed with a calender unit (super calender, soft calender, gloss calender, or the like) in order to improve the surface smoothness or increase the surface strength.

The basis weight of the recording medium in accordance with the invention is preferably 50 g/m$^2$ to 250 g/m$^2$. Where it is less than 50 g/m$^2$, the stiffness is insufficient and conveying defects can easily occur. Thus, the conveying path can be clogged with the recording medium. Where the basis weight of recording medium is more than 250 g/m$^2$, the stiffness is too high and the recording medium is not bent in the curved portions of the conveying path, thereby causing conveying defects such as clogging of the conveying path with the recording medium.

—Ink—
<Ink>

The pigment ink necessary in accordance with the invention contains at least water, a particulate colorant, a fixing agent for the colorant, and a water-soluble organic solvent and may contain, if necessary, a wetting agent, a surfactant, and other components.

—Colorant—

The cyan colorant used in accordance with the invention has to have a phthalocyanine structure. Examples of such colorants include C. I. Pigment Blue 1, 2, 3, 15 (Copper Phthalocyanine Blue R), 15:1, 15:2, 15:3 (Phthalocyanine Blue G), 15:4, 15:6 (Phthalocyanine Blue E), 15:34, 16, 17:1, 22, 56, 60, 63, C. I. Vat Blue 4, and Vat Blue 60. From the standpoint of cost and safety, Phthalocyanine Blue 15:3 is especially preferred.

Colorants for other colors are not particularly limited, provided they are in the form of powders.

At least one colorant from among pigments, dyes, and colored fine particles is preferably used as the colorant.

An aqueous dispersion of polymer fine particles containing at least any one colorant from among pigments and dyes can be advantageously used as the colored fine particles.

The expression "containing . . . colorant" herein means either any one state from among a state in which the colorant is sealed inside the polymer fine particles and a state in which the colorant is adsorbed by the surface of polymer particles, or both such states. In this case, it is not necessary that the entire colorant compounded with the ink in accordance with the invention be sealed in or adsorbed by the polymer fine particles, and the colorant may be also dispersed in the emulsion within a range in which the effect of the invention is not lost. The colorant is not particularly limited, provided it is insoluble or has poor solubility in water and can be adsorbed by the polymer, and the colorant can be appropriately selected according to the object.

The expression "insoluble or has poor solubility in water" means that the colorant is not dissolved in an amount equal to or more than 10 parts by mass in 100 parts by mass of water at a temperature of 20° C. "Soluble" means that no separation or precipitation of the colorant can be visually observed in the surface layer or lower layer of aqueous solution.

The volume-average particle size of polymer fine particles (colored fine particles) containing the colorant is preferably 0.01 µm to 0.16 µm in the ink. Where the particle size is less than 0.01 µm, the fine particles easily flow thereby increasing the bleeding of text and degrading light resistance. Conversely, wherein the particle size is more than 0.16 µm, the nozzle is easily clogged and color development ability is decreased.

Examples of suitable colorants include dyes and pigments, for example, water-soluble dyes, oil-soluble dyes, and dispersed dyes. Oil-soluble dyes and dispersed pigments are preferred from the standpoint of adsorption ability and sealing ability, but pigments can be advantageously used to ensure light resistance of the image obtained.

From the standpoint of effective impregnation into the polymer fine particles, it is preferred that the dyes be dissolved to a concentration of 2 g/L or more, more preferably 20 g/L to 600 g/L, in an organic solvent, for example, a ketone-based solvent.

The water-soluble dyes can be classified, based on the color index thereof, into acidic dyes, direct dyes, basic dyes, reactive dyes, and food dyes, and it is preferred that dyes excelling in water resistance and light resistance be used.

Self-dispersible pigments in which at least one hydrophilic group is bonded directly or via another atomic group to the pigment surface and which can be dispersed with good stability, without using a dispersant, can be advantageously used as the pigments. As a result, a dispersant that has been used in the conventional inks to disperse the pigment is unnecessary. Ionic pigments are preferred as the self-dispersible pigments, and anionically charged pigments are especially preferred.

The volume-average particle size of the self-dispersible pigment is preferably 0.01 µm to 0.16 µm in the ink.

Examples of anionic hydrophilic groups include —COOM, —SO$_3$M, —PO$_3$HM, —PO$_3$M$_2$, —SO$_2$NH$_2$, —SO$_2$NHCOR (where M stands for a hydrogen atom, an alkali metal, ammonium, or an organic ammonium; R is an alkyl group having 1 to 12 carbon atoms, an optionally substituted phenyl group, or an optionally substituted naphthyl group). Pigments in which —COOM and —SO$_3$M, from among these groups, are bonded to the color pigment surface are preferably used.

As for "M" in the aforementioned hydrophilic groups, examples of suitable alkali metals include lithium, sodium, and potassium. Examples of organic ammonium include mono- to trimethylammonium, mono- to triethylammonium, and mono- to trimethanolammonium. Examples of suitable methods for obtaining the anionically charged color pigments include methods by which —COONa is introduced into the color pigment surface, such as a method of oxidizing the color pigment with sodium hypochlorite, a method involving sulfonation, and a method of reacting with a diazonium salt.

A pigment dispersion using a pigment dispersant can be also used in accordance with the invention.

Examples of pigment dispersants include natural hydrophilic polymer compounds such as vegetable polymers, e.g., gum arabic, tragacanth gum, gua gum, karaya gum, locust bean gum, arabinogalactan, pectin, and queen's seed starch, seaweed polymers such as alginic acid, carrageenen, and agar, animal polymers such as gelatin, casein, albumen, and collagen, and microorganism polymers such as xanthene gum and dextran.

Examples of suitable semisynthetic materials include cellulose polymers such as methyl cellulose, ethyl cellulose, hydroxyethyl cellulose, hydroxypropyl cellulose, and carboxymethyl cellulose, starch polymers such as sodium glycolate starch and sodium ester phosphate starch, seaweed polymers such as sodium alginate and propylene glycol ester alginate.

Examples of pure synthetic materials include vinyl polymers such as polyvinyl alcohol, polyvinyl pyrrolidone, and polyvinyl methyl ether, acrylic polymers such as non-crosslinked polyacrylamide, polyacrylic acid or alkali metal salt thereof, and water-soluble styrene acrylic resin, and natural polymer compounds such as water-soluble styrene maleic acid resin, water-soluble vinyl naphthalene acrylic resin, water-soluble vinyl naphthalene maleic acid resin, polyvinyl pyrrolidone, polyvinyl alcohol, alkali metal salt of β-naphthalenesulfonic acid formalin condensate, polymer compounds having a salt of a cationic functional group such as quaternary ammonium or amino group in the side chain thereof, and shellac.

Among them, compounds having introduced therein a carboxyl group, such as homopolymers of acrylic acid, methacrylic acid, or styrene acrylic acid, or copolymers of monomers having other hydrophilic groups are especially preferred as the polymer dispersant.

The weight-average molecular weight of the copolymer is preferably between 3,000 and 50,000, more preferably between 5,000 and 30,000, even more preferably between 7,000 and 15,000. The mixing mass ratio of the pigment and the dispersant is preferably within a range of 1:0.06 to 1:3, more preferably within a range of 1:0.125 to 1:3.

The amount of the colorant added to the ink is preferably 2 mass % to 15 mass %, more preferably 3 mass % to 12 mass %. When the amount added less than 2 mass %, image density may be decreased due to lowered coloring strength, or feathering or bleeding may be worsened due to lowered viscosity. When the amount added is more than 15 mass %, a nozzle can easily dry up, for example, when the inkjet recording apparatus is allowed to stay, resulting in a no-discharge phenomenon. Furthermore, the viscosity becomes too high, causing lowered permeability and preventing dots from spreading, which causes decrease in image density and blank zones in the image.

—Permeation Enhancing Agent—

A permeation enhancing agent is such an organic solvent that functionally demonstrates a significant effect in enhancing the permeation of ink into paper (on the other hand, a wetting agent is such an organic solvent that demonstrates wetting effect in preventing the head from drying). Specific examples of permeation enhancing agents include polyol compounds having 8 or more carbon atoms and glycol ether compounds. Thus, a water-soluble organic solvent such as a polyol compound or glycol ether compound is used as the permeation enhancing agent in accordance with the invention. In particular, at least one compound from among polyol compounds having 8 or more carbon atoms and glycol ether compounds can be advantageously used.

Where the number of carbon atoms in the polyol compound is less than 8, sufficient permeation ability cannot be obtained, recording medium is contaminated during printing on both sides, spread of ink on the recording medium is insufficient, and pixel cover ratio is degraded. As a result, symbol quality or image density are sometimes degraded.

Examples of preferred polyol compounds having 8 or more carbon atoms include 2-ethyl-1,3-hexanediol (solubility 4.2% (25° C.)) and 2,2,4-trimethyl-1,3-pentanediol (solubility 2.0% (25° C.)).

No particular limitation is placed on the glycol ether compounds and they can be appropriately selected according to the object. Examples of suitable compounds include polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether, and polyhydric alcohol aryl ethers such as ethylene glycol monophenyl ether and ethylene glycol monobenzyl ether.

The amount of the permeation enhancing agent added to the ink is not particularly limited and can be appropriately selected according to the object, but the amount of 0.1 mass % to 20 mass % is preferred, and the amount of 0.5 mass % to 10 mass % is even more preferred.

The amount of the water-soluble organic solvent added to the ink is preferably 0.1 mass % to 20 mass %, more preferably 0.5 mass % to 10 mass %.

—Wetting Agent—

The wetting agent is not particularly limited and can be appropriately selected according to the object. For example, a compound of at least one kind selected from polyol compounds, lactam compounds, urea compounds, and saccharides can be advantageously used. The amount of the wetting agent added to the ink is preferably 5 mass % to 40 mass %, more preferably 10 mass % to 30 mass %.

Examples of suitable polyol compounds include polyhydric alcohols, polyhydric alcohol alkyl ethers, polyhydric alcohol aryl ethers, nitrogen-containing heterocyclic compounds, amides, amines, sulfur-containing compounds, propylene carbonates, and ethylene carbonate. These compounds may be used individually or in combinations of two or more thereof.

Examples of polyhydric alcohol include ethylene glycol, diethylene glycol, triethylene glycol, polyethylene glycol, polypropylene glycol, 1,3-propanediol, 1,3-butanediol, 1,4-butanediol, 3-methyl-1,3-butanediol-1,3-propanediol, 1,5-pentanediol, 1,6-hexanediol, glycerol, 1,2,6-hexanetriol, 1,2,4-butanetriol, 1,2,3-butanetriol, and petriol.

Examples of polyhydric alcohol alkyl ethers include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Examples of polyhydric alcohol aryl ethers include ethylene glycol monophenyl ether and ethylene glycol monobenzyl ether.

Examples of nitrogen-containing heterocyclic compounds include N-methyl-2-pyrrolidone, N-hydroxyethyl-2-pyrrolidone, 2-pyrrolidone, 1,3-dimethylimidazolidinone, and ε-caprolactam.

Examples of amides include formamide, N-methylformamide, formamide, N,N-dimethyl formamide.

Examples of amines include monoethanolamine, diethanolamine, triethanolamine, monoethylamine, diethyl amine, and triethylamine.

Examples of sulfur-containing compounds include dimethylsulfoxide, sulfolan, and thiodiethanol.

Among these compounds, from the standpoint of obtaining an excellent effect in terms of dissolution and preventing the degradation of ejection characteristic due to evaporation of water, the preferred ones are glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol-1,3-propanediol, 1,5-pentanediol, tetraethylene glycol, 1,6-hexanediol, 2-methyl-2,4-pentanediol, polyethylene glycol, 1,2,4-butanetriol, 1,2,6-hexanetriol, thiodiglycol, 2-pyrrolidone, N-methyl-2-pyrrolidone, and N-hydroxyethyl-2-pyrrolidone.

At least one compound selected from 2-pyrrolidone, N-methyl-2-pyrrolidone, N-hydroxyethyl-2-pyrrolidone, and ε-caprolactam can be used as the lactam compound.

At least one compound selected from urea, thiourea, ethyleneurea, and 1,3-dimethyl-2-imidazolidinone can be used as the urea compound. The amount of the urea compound added to the ink is typically preferred to be 0.5 mass % to 50 mass %, more preferably 1 mass % to 20 mass %.

Examples of saccharides include monosaccharides, disaccharides, oligosaccharides (including trisaccharides and tetrasaccharides), polysaccharides, and derivatives thereof. Among them, glucose, mannose, fructose, ribose, xylose, arabinose, galactose, maltose, cellobiose, lactose, sucrose, trehalose, and maltotriose are preferred and maltitose, sorbitose, gluconolactone, and maltose are especially preferred.

The polysaccharides mean sugars in a broad sense and may be employed to mean substances widely present in the natural world, such as α-cyclodextrin and cellulose.

The derivatives of the saccharides may include, for example, reduced sugar of the saccharides (for example, sugar alcohol, represented by a general formula $HOCH_2(CHOH)_nCH_2OH$ (where n represents any of integers 2 to 5)), oxidized sugar (for example, aldonic acid and uronic acid), amino acids, and thio acid. Among them, sugar alcohol is preferred. Examples of sugar alcohols include maltitol and sorbit.

The amount of the wetting agent contained in the ink is 10 mass % to 50 mass %, more preferably 20 mass % to 35 mass %. When the amount contained is too low, a nozzle may easily become dry, causing abnormal discharge of ink droplets. When the amount contained is too high, viscosity of ink increases, exceeding the appropriate viscosity range.

—Surfactant—

The surfactant is not particularly limited and can be appropriately selected according to the object. Examples of suitable surfactants include anionic surfactants, nonionic surfactants, amphoteric surfactants, nonionic surfactants, acetylene glycol surfactants, and fluorine-containing surfactants.

Examples of anionic surfactants include polyoxyethylene alkyl ether acetate, dodecylbenzene sulfonate, salts of lauric acid, and polyoxyethylene alkyl ether sulfate salts.

Examples of nonionic surfactants include acetylene glycol surfactants, polyoxyethylene alkyl ethers, polyoxyethylene alkyl phenyl ethers, polyoxyethylene sorbitan fatty acid esters, polyoxypropylene polyoxyethylene alkyl ethers, polyoxyethylene alkyl esters, polyoxyethylene sorbitan fatty acid esters, polyoxyethylene alkylamines, and polyoxyethylene alkylamides.

Examples of acetylene glycol surfactants include 2,4,7,9-tetramethyl-5-decyne-4,7-diol, 3,6-dimethyl-4-octyne-3,6-diol, and 3,5-dimethyl-1-hexyne-3-ol. Examples of commercial products of the acetylene glycol surfactants include Surfynol 104, 82, 465, 485, TG, manufactured by Air Products and Chemicals Inc. (U.S.A.).

Examples of the amphoteric surfactant include laurylamino propionate, lauryl dimethyl betaine, stearyl dimethyl betaine, and lauryl dihydroxyethyl betaine. More specific examples include lauryl dimethyl amine oxide, miristyl dimethyl amine oxide, stearyl dimethyl amine oxide, dihydroxyethyl lauryl amine oxide, polyoxyethylene palm oil alkyl dimethyl amine oxide, dimethyl alkyl (palm) betaine, and dimethyl lauryl betaine.

Among these surfactants, the surfactants represented by the following General Formulas (I), (II), (III), (IV), (V), and (VI) are preferred.

$$R^1-O-(CH_2CH_2O)_hCH_2COOM \quad \text{General Formula (I)}$$

In General Formula (I), $R^1$ represents an alkyl group, and h represents any integer from 3 to 12. M represents any one selected from alkali metal ions, quaternary ammonium, quaternary phosphonium, and alkanolamines.

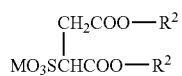
General Formula (II)

In General Formula (II), $R^2$ represents an alkyl group. M represents any one selected from alkali metal ions, quaternary ammonium, quaternary phosphonium, and alkanolamines.

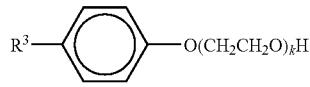
General Formula (III)

In General Formula (III), $R^3$ represents a hydrocarbon group. k represents an integer from 5 to 20.

$$R^4-(OCH_2CHO_2)_jOH \quad \text{General Formula (IV)}$$

In General Formula (IV), $R^4$ represents a hydrocarbon group. j represents an integer from 5 to 20.

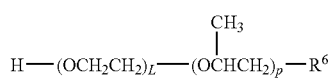
General Formula (V)

In General Formula (V), $R^6$ represents a hydrocarbon group. L and p represent integers from 1 to 20.

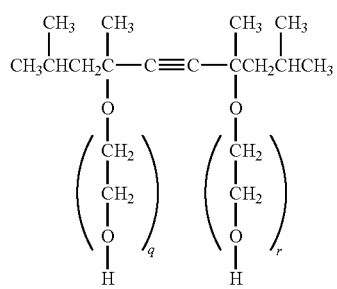
General Formula (VI)

In General Formula (VI), q and r represent integers from 0 to 40, respectively.

The surfactants of the structural formulas (I) and (II) are specifically shown below in the form of free acids.

(I-1):
$$CH_3(CH_2)_{12}O(CH_2CH_2O)_3CH_2COOH$$
(I-2):
$$CH_3(CH_2)_{12}O(CH_2CH_2O)_4CH_2COOH$$
(I-3):
$$CH_3(CH_2)_{12}O(CH_2CH_2O)_5CH_2COOH$$
(I-4):
$$CH_3(CH_2)_{12}O(CH_2CH_2O)_6CH_2COOH$$
(I-5):
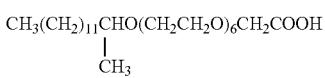
(I-6):
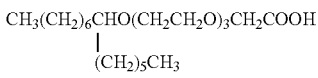
(II-1):
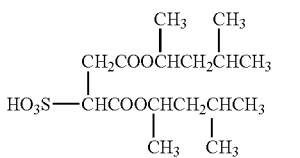
(II-2):
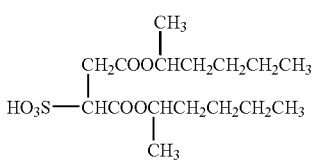
(II-3):
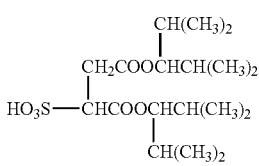
(II-4):
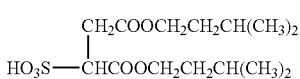

The preferred fluorine-containing surfactants are represented by the following General Formula (II-5).

$$CF_3CF_2(CF_2CF_2)_m-CH_2CH_2O(CH_2CH_2O)_nH \quad (II-5)$$

In General Formula (II-5), m represents an integer of 0 to 10. n represents an integer of 1 to 40.

Examples of fluorine-containing surfactants include perfluoroalkyl sulfonic acid compounds, perfluoroalkyl carboxyl compounds, perfluoroalkyl phosphoric acid ester compounds, perfluoroalkyl ethylene oxide adducts, polyoxyalkylene ether polymer compounds having a perfluoroalkyl ether group in the side-chain, and the like. Among them, polyoxyalkylene ether polymer compounds having a perfluoroalkyl ether group in the side-chain are especially preferred because of low foaming property and high safety because they have low bioaccumulation ability of fluorine-containing compounds, which has recently been viewed as a problem.

Examples of the perfluoroalkyl sulfonic acid compounds include perfluoroalkyl sulfonic acids and perfluoroalkyl sulfonates.

Examples of the perfluoroalkyl carboxyl compounds include perfluoroalkyl carboxylic acids and perfluoroalkyl carboxylates.

Examples of the perfluoroalkyl phosphoric acid ester compounds include perfluoroalkyl phosphoric acid esters and salts of perfluoroalkyl phosphoric acid esters.

Examples of the polyoxyalkylene ether polymer compounds having a perfluoroalkyl ether group in the side-chain include polyoxyalkylene ether polymers having a perfluoroalkyl ether group in the side-chain, sulfuric acid esters and salts of polyoxyalkylene ether polymer having a perfluoroalkyl ether group in the side-chain, and salts of polyoxyalkylene ether polymers having a perfluoroalkyl ether group in the side-chain.

Examples of counter ions of salts in the fluorine-containing surfactants include Li, Na, K, $NH_4$, $NH_3CH_2CH_2OH$, $NH_2(CH_2CH_2OH)_2$, and $NH(CH_2CH_2OH)_3$.

Appropriately synthesized surfactants or commercial products may be used as the fluorine-containing surfactants.

Examples of commercially available products include Sarfron S-111, S-112, S-113, S-121, S-131, S-132, S-141, S-145 (all of which are products of Asahi Glass Co., Ltd), Flulard FC-93, FC-95, FC-98, FC-129, FC-135, FC-170C, FC-430, FC-431 (all of which are products of Sumitomo 3M Co., Ltd.), Megafac F-470, F1405, and F-474 (all of which are products of Dainippon Ink and Chemicals Inc.), Zonyl TBS, FSP, FSA, FSN-100, FSN, FSO-100, FSO, FS-300, and UR (all of which are products of Du Pont Co.), FT-110, FT-250, FT-251, FT-400S, FT-150, FT-400SW (all of which are products of NEOS Company Limited), and PF-151N (product of Omnova Solutions Inc.). Among them, Zonyl FS-300, FSN, FSN-100, and FSO (products of Du Pont) are especially preferred.

The surface tension is preferably equal to or less than 30 mN/m, more preferably equal to or less than 25 mN/m at 25° C.

Any resin emulsion can be used as the pigment fixing agent.

—Resin Emulsion—

In the resin emulsion, fine resin particles are dispersed in water as a continuous phase. If necessary, the resin emulsion may include a dispersant such as a surfactant.

It is generally preferred that the content of fine resin particles as the dispersed phase (content of resin particle in the resin emulsion) be 10 mass % to 70 mass %. Moreover, with consideration for the use in an ink-jet recording apparatus, it is preferred that the particle size of the fine resin particles be 10 nm to 1,000 nm, more preferably 20 nm to 300 nm.

The fine resin particle component of the dispersed phase is not particularly limited and can be appropriately selected according to the object. For example, acrylic resin, vinyl acetate resin, styrene resin, butadiene resin, styrene-butadiene resin, vinyl chloride resin, acryl-styrene resin, and acryl-silicone resin can be selected and among them, acryl-silicone resin is especially preferred.

Appropriately synthesized resin emulsions or commercial products may be used as the fluorine-containing surfactants.

Examples of commercially available products include Micro Gel E-1002 and E-5002 (styrene-acrylic resin emulsions, product of Nippon Paint Co., Ltd.), Bon Coat 4001 (acrylic resin emulsion, product of Dainippon Ink and Chemicals Inc.), Bon Coat 5454 (styrene-acrylic resin emulsion, product of Dainippon Ink and Chemicals Inc.), SAE-1014 (styrene-acrylic resin emulsion, product of Nippon Zeon Corp.), Saivinol SK-200 (acrylic resin emulsion, product of Saiden Chemical Industry Co., Ltd.), Primal AC-22 and AC-61 (acrylic resin emulsions, products of Rohm and Haas Co., Ltd.), Nanocryl SBCX 2821 and 3689 (acrylic silicone resin emulsions, products of Toyo Ink Mfg. Co.), #3070 (methyl methacrylate copolymer resin emulsion, product of Mikuni Color Ltd.).

It is preferred that the amount of fine resin particles of the resin emulsion that is added to the ink be 0.1 mass % to 50 mass %, more preferably 0.5 mass % to 20 mass %, even more preferably 1 mass % to 10 mass %. When the amount added is less than 0.1 mass %, a sufficient effect cannot be obtained in preventing clogging and improving discharge stability, and when the amount added exceeds 50 mass %, it may decrease the preservation stability of the ink.

—Other Components—

Other components are not particularly limited and can be appropriately selected according to the object. Examples of other components include pH adjusters, preservatives, antimold agents, corrosion inhibitors, antioxidants, UV absorbers, oxygen absorbents, and photostabilizers.

Examples of preservatives and antimold agents include 1,2-benzisothiazoline-3-one, sodium dehydroacetate, sodium sorbate, 2-pyridinethiol-1-oxide sodium, sodium benzoate, and pentachlorophenol sodium.

No particular limitation is placed on the pH adjusters and any substance can be used provided that it can adjust the pH value to 7 or more, without adversely affecting the prepared ink.

Examples of suitable pH adjusters include amines such as diethanolamine and triethanolamine, alkali metal hydroxides such as lithium hydroxide, sodium hydroxide, and potassium hydroxide, ammonium hydroxide, quaternary ammonium hydroxide, quaternary phosphonium hydroxide, and alkali metal carbonates such as lithium carbonate, sodium carbonate, and potassium carbonate.

Examples of corrosion inhibitors include acidic sulfite, sodium thiosulfate, ammonium thiodiglycolate, diisopropyl ammonium nitrate, pentaerythritol tetranitrate, and dicyclohexylammonium nitrate.

Examples of antioxidants include phenol-containing antioxidants (including hindered phenol-containing antioxidants), amine-containing antioxidants, sulfur-containing antioxidants, and phosphorus-containing antioxidants.

The ink in accordance with the invention is manufactured by dispersing or dissolving at least water, a colorant, a water-soluble organic solvent, a wetting agent, a surfactant, and, if necessary, other components in an aqueous solvent and then stirring and mixing, if necessary. The dispersing operation can be performed with a sand mill, a homogenizer, a ball mill, a paint shaker, and an ultrasonic dispersing machine, and stirring and mixing can be performed by using a stirring machine using the usual impeller, a magnetic stirrer, and a high-speed dispersing machine.

Physical properties of the ink, for example, viscosity, surface tension, and pH, are preferably within the following ranges.

Viscosity of the ink is preferably 1 cps or more and 30 cps or less, more preferably 2 cps to 20 cps at a temperature of 25° C. Where the viscosity is higher than 20 cps, stability of discharge may be difficult to ensure.

The pH is preferably 7 to 10, for example.

The color of the ink is not particularly limited and can be selected according to the object. Examples of suitable colors include yellow, magenta, cyan, and black. Where recording is carried out by using an ink set employing the colors of two or more types, a multicolor image can be formed, and where recording is carried out by using an ink set employing a full-color combination, a full-color image can be formed.

In accordance with the invention, good image can be formed on the conventional coated paper for printing and also on the paper satisfying the above-described conditions.

The conventional coated paper for printing as referred to herein is coated paper that is used for commercial printing and publishing printing and includes the so-called art paper (A0, A1), coated paper (A2, B2), lightweight coated paper (A3, B3), and microcoated paper that are types of paper classified for use based on the amount of coating in accordance with the product classification of the Ministry of Economy Trade and Industry of Japan and Japan Paper Association, such paper being used for offset printing, gravure printing and the like. The art paper as referred to herein is paper with an amount of coating on one side (amount of solids) of 20 g/m$^2$ or more, the coated paper has an amount of coating on one side (amount of solids) of 10 g/m$^2$ to 20 g/m$^2$, the lightweight coated paper has an amount of coating on one side (amount of solids) of 6 g/m$^2$ to 10 g/m$^2$, and the microcoated paper has an amount of coating on one side (amount of solids) of 6 g/m$^2$ or less.

Further, in accordance with the invention, ink absorption is small and ink components hardly penetrate into the paper. Therefore, cast coat paper can be advantageously used. The cast coat paper as referred to herein is classified according to the manufacturing method, by contrast with the above-described classification based on the amount of coating. In the manufactured of cast coat paper, the coating liquid that is not fully dry is wrapped around a heated roll (casting drum) with a mirror finish surface and the roll surface is transferred to obtain paper with smooth surface similar to that of the mirror finish surface. The amount of coating (amount of solids) on the cast coat paper is usually 20 g/m$^2$ to 30 g/m$^2$. Specific examples of commercial products of the cast coat paper include Mirror Coat Platinum (manufactured by Oji Paper Co., Ltd.) and Espri Coat C (manufactured by Nippon Paper Industries Co., Ltd.)

As for specific commercial products, examples of cast coat paper include Mirror Coat Platinum (manufactured by Oji Paper Co., Ltd.) and Espri Coat C (manufactured by Nippon Paper Industries Co., Ltd.).

Examples of commercial products of art paper include OK Kanefuji N, OK Kanefuji-R4ON, SA Kanefuji N, Satin Kanefuji N, Satin Kanefuji-R4ON, Ultrasatin Kanefuji N, Ultra OK Kanefuji N and Kanefuji one side (manufactured by Oji Paper Co., Ltd.); NPi Special Art, NPi Super Art, NPi Super Dull and NPi Dull Art (manufactured by Nippon Paper Industries Co., Ltd.); Utrillo Super Art, Utrillo Supper Dull and Utrillo Super Premium (manufactured by Daio Paper Corp.); High-Quality Art A, Tokuhishi Art, Super Mat Art A, High-Quality Dull Art A (manufactured by Mitsubishi Paper Mills Limited); and Raicho Super Art N, Raicho Super Art MN, Raicho Special Art and Raicho Dull Art N (manufactured by Chuetsu Pulp & Paper Co., Ltd.).

Examples of commercial products of A2 coated paper include OK Top Coat+(Plus), OK Top Coat S, OK Casablanca, OK Casablanca V, OK Trinity, OK Trinity NaVi, New Age, New Age W, OK Top Coat Mat N, OK Royal Coat, OK Top Coat Dull, Z Coat, OK Kasahime, OK Kasao, OK Kasao Satin, OK Top Coat+, OK Non-wrinkle, OK Coat V, OK Coat N Green 100, OK Mat Coat Green 100, New Age Green 100, and Z Coat Green 100 (manufactured by Oji Paper Co., Ltd.); Aurora Coat, Shiraoi Mat, Imperial Mat, Silver Diamond, Recycle Coat 100 and Cycle Mat 100 (manufactured by Nippon Paper Industries Co., Ltd.); Mu Coat, Mu White, Mu Mat, and White Mu Mat (manufactured by Hokuetsu Paper Mills, Ltd.); Raicho Coat N, Regina Raicho Coat 100, Raicho Mat Coat N, and Regina Raicho Mat 100 (manufactured by Chuetsu Pulp& Paper Co., Ltd.); Pearl Coat, White Pearl Coat N, New V Mat, White New V Mat, Pearl Coat REW, White Pearl Coat NREW, New V Mat REW and White New V Mat REW (manufactured by Mitsubishi Paper Mills Limited).

Examples of commercial products of A3 coated paper (lightweight coating) include OK Coat L, Royal Coat L, OK coat LR, OK White L, OK Royal Coat LR, OK Coat L Green 100, OK Mat Coat L Green 100 (manufactured by Oji Paper Co., Ltd.), Easter DX, Recycle Coat L 100, Aurora L, Recycle Mat L 100, <SSS> Energy White (manufactured by Nippon Paper Industries Co., Ltd.); Utrillo Coat L, Matisse Coat (manufactured by Daio Paper Corporation); Hi Alpha, Alpha Mat, (N) Kinmari L, Kinmari HiL (manufactured by Hokuetsu Paper Mills, Ltd.); N Pearl Coat L, N Pearl Coat LREW, and Swing Mat REW (manufactured by Mitsubishi Paper Mills Limited); and Super Emine, Emine, and Chaton (manufactured by Chuetsu Pulp & Paper Co., Ltd.).

Examples of commercial products of B2 coated paper (medium quality coating) include OK Medium Quality Coat, (F) MCOP, OK Astro Gloss, OK Astro Dull, and OK Astro Mat (manufactured by Oji Paper Co., Ltd.); and King O (manufactured by Nippon Paper Industries Co., Ltd.).

Examples of commercial products of microcoated paper include OK Royal Light S Green 100, OK Ever Light Coat, OK Ever Light R, OK Ever Green, Clean Hit MG, OK Microcoated Super Eco G, Eco Green Dull, OK Microcoated Mat Eco G 100, OK Star Light Coat, OK Soft Royal, OK Bright, Green Hit G, Yamayuri Bright, Yamayuri Bright G, OK Aqua Light Coat, OK Royal Light S Green 100, OK Bright (rough, gloss), Snow Mat, Snow Mat DX, OK Kasahime, OK Kasayuri (manufactured by Oji Paper Co., Ltd.), Pyrene DX, Pegasus Hyper 8, Aurora 5, Andes DX, Super Andes DX, Space DX, Seine DX, special Gravure DX, Pegasus, Silver Pegasus, Pegasus Harmony, Greenland DX 100, Super Greenland DX 100, <SSS> Energy Soft, <SSS> Energy Light, EE Henry (manufactured by Nippon Paper Industries Co., Ltd.); Kant Excel, Excel Super B, Excel Super C, Kant Excel Bal, Utrillo Excel, Heine Excel, Dante Excel (manufactured by Daio Paper Corporation); Cosmo Ace (manufactured by Nippon Daishowa Paperboard Co., Ltd.); Semi-Jo L, Hi Beta, Hi Gamma, Shiromari L, Hamming, White Hamming, Semi-Jo HiL, Shiromari HiL (manufactured by Hokuetsu Paper Mills, Ltd.); Ruby Light HREW, Pearl Soft, Ruby Light H (manufactured by Mitsubishi Paper Mills Limited); Chaton, Ariso, Smash (manufactured by Chuetsu Pulp & Paper Co., Ltd.); and Star Cherry, Super Cherry (manufactured by Marusumi Paper Co., Ltd.).

Any special coated paper that satisfies the conditions set forth in the claims of the present patent application can be used as the medium according to the present patent application. Examples of suitable paper include some kinds of coated paper for electrophotography and coated paper for gravure printing. More specific examples include POD Gloss Coat (manufactured by Oji Paper Co., Ltd.), Space DX (manufactured by Nippon Paper Industries Co., Ltd.), and Earth (manufactured by Nippon Paper Industries Co., Ltd.). The fine pore volume of the coated layer in the paper of these types is adequate and such paper can be used as the medium of the present patent application.

(Ink Cartridge)

In the ink cartridge in accordance with the invention, the ink of the ink media set in accordance with the invention is accommodated in a container. If necessary the ink cartridge may have other components that are appropriately selected.

The container is not particularly limited, and the shape, structure, size and material thereof can be appropriately selected according to the object. For example, the container can advantageously have at least an ink bag formed from an aluminum laminated film, a resin film, or the like.

The ink cartridge will be explained below with reference to FIG. 2 and FIG. 3. Here, FIG. 2 illustrates an example of the ink cartridge in accordance with the invention, and FIG. 3 is a drawing also including the case (housing) of the ink cartridge shown in FIG. 2.

Figure 2:
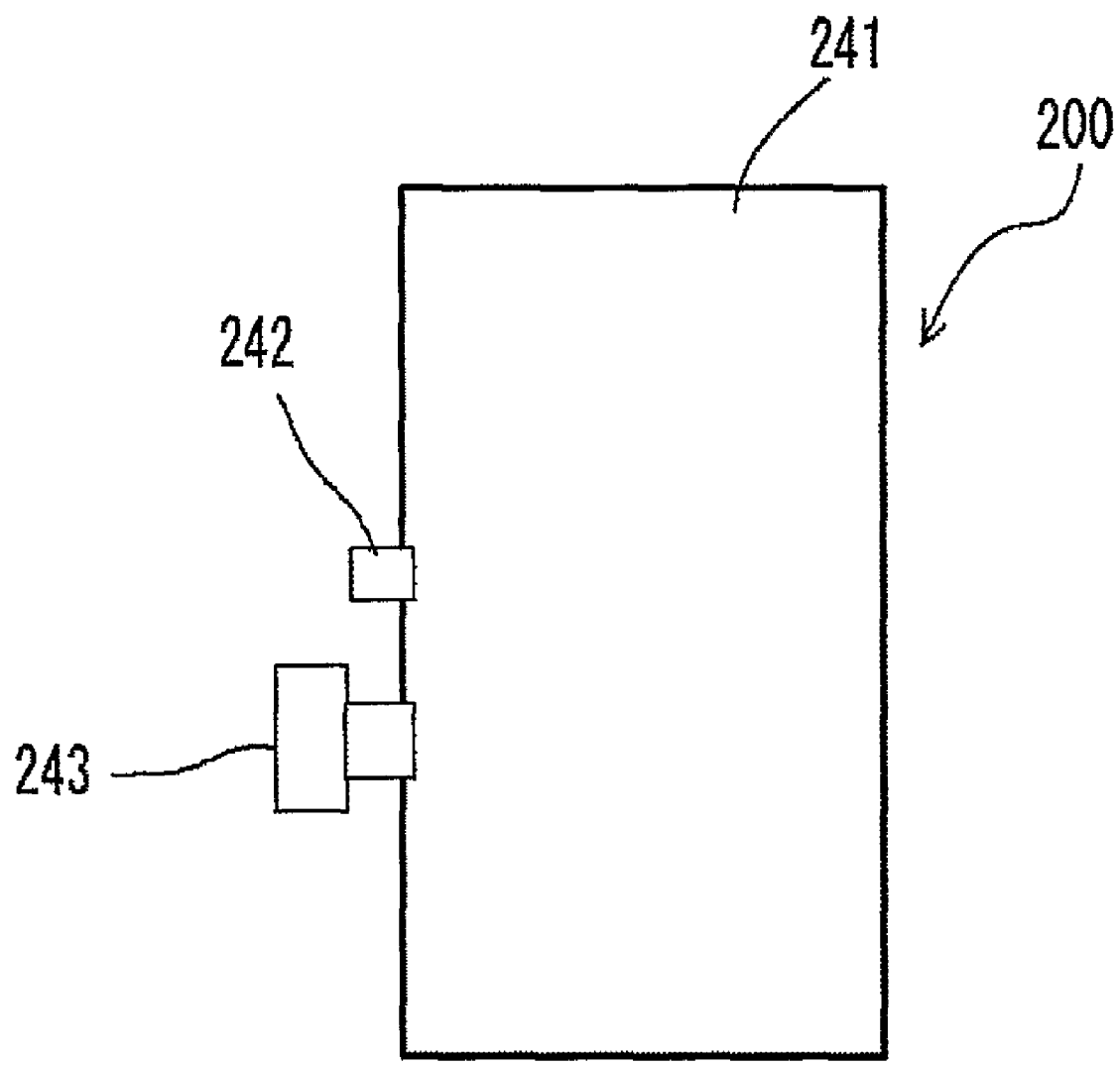
FIG. 2 is a schematic drawing illustrating an example of the ink cartridge in accordance with the invention.
Figure 3:
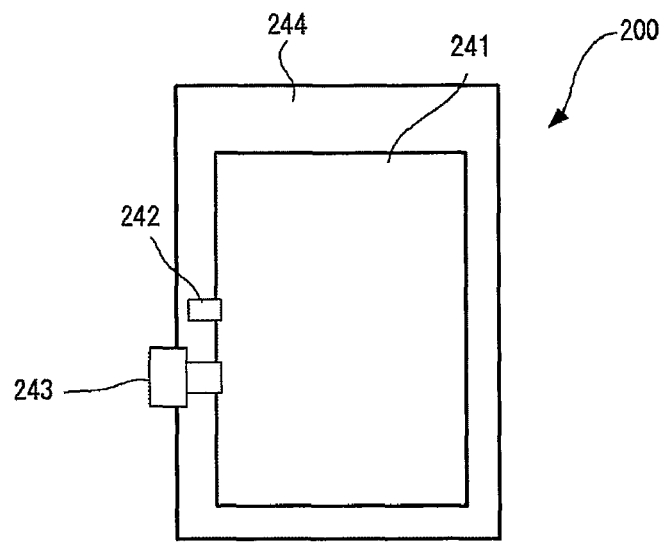
FIG. 3 is a schematic drawing also including the case (housing) of the ink cartridge shown in FIG. 2.

As shown in FIG. 2, in an ink cartridge (200), an ink bag (241) is filled and discharged via an ink charging port (242), and the ink charging port (242) is closed by fusion. When the ink cartridge is used, an ink discharge port (243) that is made from a rubber member is pierced with a needle of the apparatus body and the ink is supplied into the apparatus.

The ink bag (241) is formed from a packaging material such as an aluminum laminated film that is impermeable. As shown in FIG. 3, the ink bag (241) is usually accommodated inside a plastic cartridge case (housing) (244) and can be used by detachably mounting on ink-jet recording apparatuses of various kinds.

The ink cartridge in accordance with the invention accommodates the ink of the ink media set in accordance with the invention and can be used by detachably mounting on ink-jet recording apparatuses of various kinds. It can be especially advantageously used by detachably mounting on the below-described ink-jet recording apparatus in accordance with the invention.

(Ink-Jet Recording Apparatus and Ink-Jet Recording Method)

The ink-jet recording apparatus in accordance with the invention has at least an ink jetting means and, if necessary, other appropriately selected means, for example, an energizing means and a control means.

The ink-jet recording method in accordance with the invention includes at least an ink jetting step and, if necessary, other appropriately selected steps, for example, an energizing step and a control step.

The ink-jet recording method in accordance with the invention can be advantageously implemented by the ink-jet recording apparatus in accordance with the invention, and the ink jetting step can be advantageously performed with the ink jetting means. Other aforementioned steps can be advantageously performed with respective aforementioned means.

—Ink Jetting Step and Ink Jetting Means—

The ink jetting step is a step in which the ink of the ink media set in accordance with the invention is energized, ink droplets are propelled, and an image is recorded on the recording media in the ink media set.

The ink jetting means is a means for energizing the ink of the ink media set in accordance with the invention, jetting the ink droplets, and recording an image on the recording media in the ink media set. No particular limitation is placed on the ink jetting means and, for example, nozzles of various kinds for ink ejection can be used as the ink jetting means.

In accordance with the invention, it is preferred that at least some of a liquid chamber, a fluid resistance portion, a vibration plate, and a nozzle member of the ink-jet head be formed from a material comprising at least one element from silicon and nickel.

The diameter of the ink-jet nozzle is preferably 30 μm or less, more preferably 1 μm to 20 μm.

A configuration is preferred in which a sub-tank for supplying the ink is provided on the ink-jet head and the sub-tank be replenished with the ink from the ink cartridge via a supply tube.

The energizing can be induced, for example, with the aforementioned energizing means. No particular limitation is placed on the energizing and it can be appropriately selected according to the object. Examples of suitable energizing means include heat, pressure, vibrations, and light. Those kinds of energizing may be used individually or in combinations of two or more thereof. Among them, heat and pressure are especially preferred.

Examples of suitable energizing means include a heater, a pressurizing device, a piezoelectric element, a vibration generating device, an ultrasonic oscillator, and light. More specific examples of suitable energizing means include a piezoelectric actuator such as a piezoelectric element, a thermal actuator that employs an electro-thermal conversion element such as a heat-generating resistor and uses phase transition caused by film evaporation of a liquid, a shape memory alloy actuator that uses metal phase transition induced by a change in temperature, and an electrostatic actuator that uses static electric power.

No particular limitation is placed on the mode of jetting ink droplets in the ink media set, and it can differ according to the type of energizing. For example, when the energizing means is "heat", a method can be used by which heat energy corresponding to the recording signal is provided to the ink located in the recording head by using, for example, a thermal head, bubbles are generated in the ink by the thermal energy, and the ink is discharged and sprayed in the form of droplets from the nozzle holes of the recording head under the effect of bubble pressure. Further, when the energizing means is "pressure", for example, a method can be used by which a pressure is applied to a piezoelectric element adhesively bonded to a position called a pressure chamber inside an ink channel in the recording head, wherein the piezoelectric element is deformed, the volume of the pressure chamber is reduced, and the ink is discharged and sprayed in the form of droplets from the nozzle holes.

The size of the propelled ink droplets is preferably 1 pL to 40 pL, the discharge and spraying rate is preferably 5 m/sec to 20 m/sec, the drive frequency is preferably 1 kHz or more, and the resolution is 300 dpi or more.

No particular limitation is placed on the control means, provided that it can control the operation of each means, and the control means can be selected appropriately according to the object. Examples of suitable control means include devices such as a sequencer and a computer.

One mode for carrying out the ink-jet recording method in accordance with the invention with the ink-jet recording apparatus in accordance with the invention will be described below with reference to the appended figures. The ink-jet recording apparatus shown in FIG. 4 has an apparatus body (101), a paper feed tray (102) filled with paper and mounted on the apparatus body (101), a discharged paper tray (103) mounted on the apparatus body (101) and serving to stock the paper on which images have been recorded (formed), and an ink cartridge loading unit (104).

Figure 4:
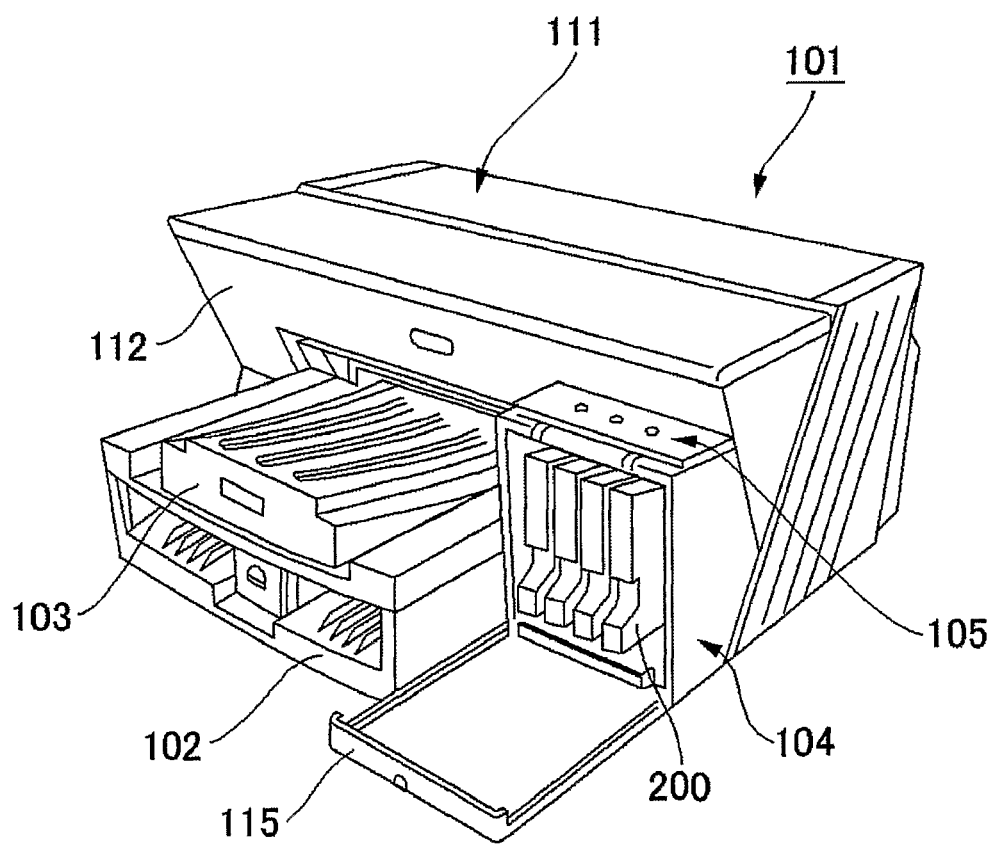
FIG. 4 is a perspective explanatory drawing illustrating the state in which a cover of an ink cartridge filling section of the ink jet-recording apparatus is open.
Figure 5:
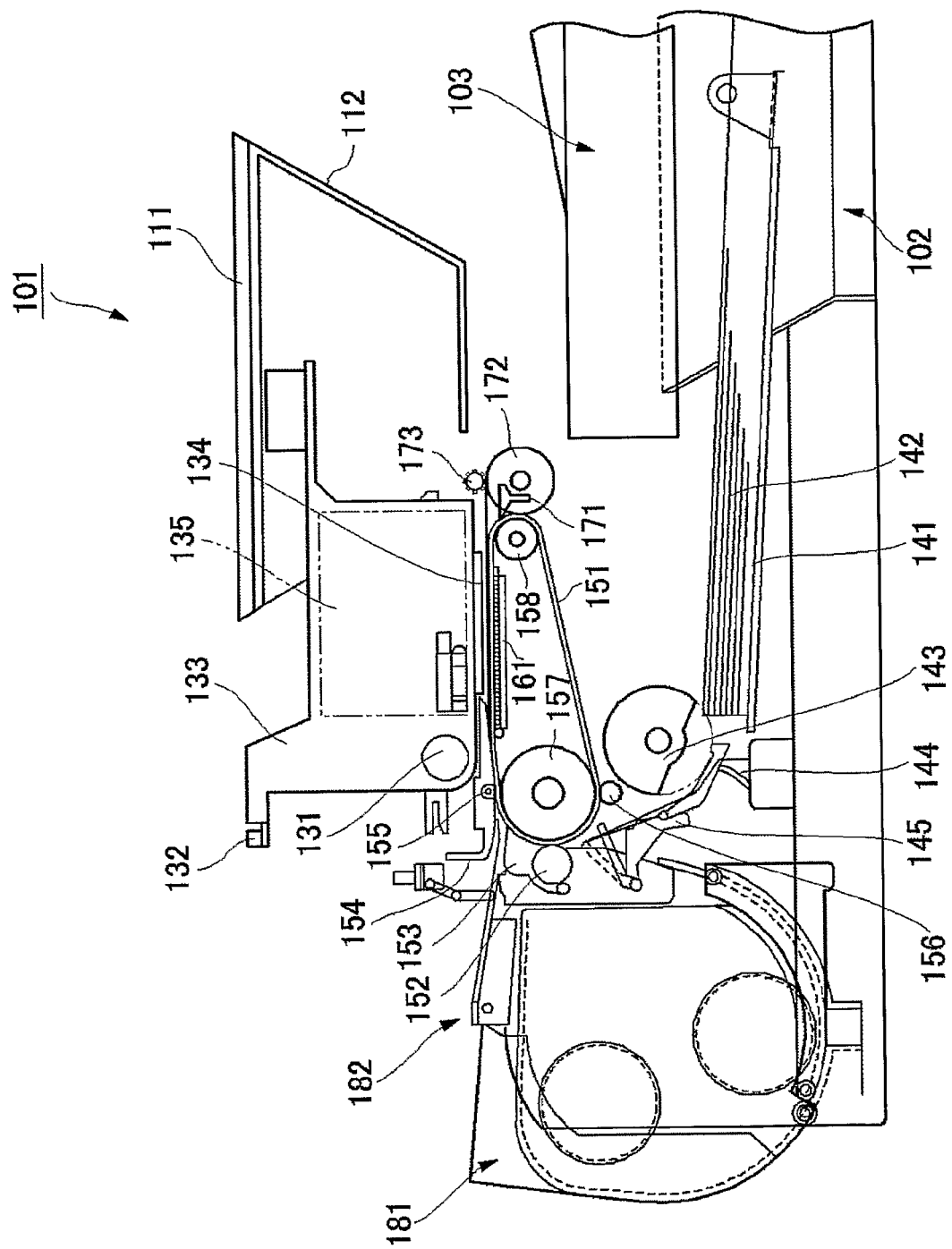
FIG. 5 is a schematic structural drawing illustrating the entire structure of the inkjet recording apparatus.
Figure 6:
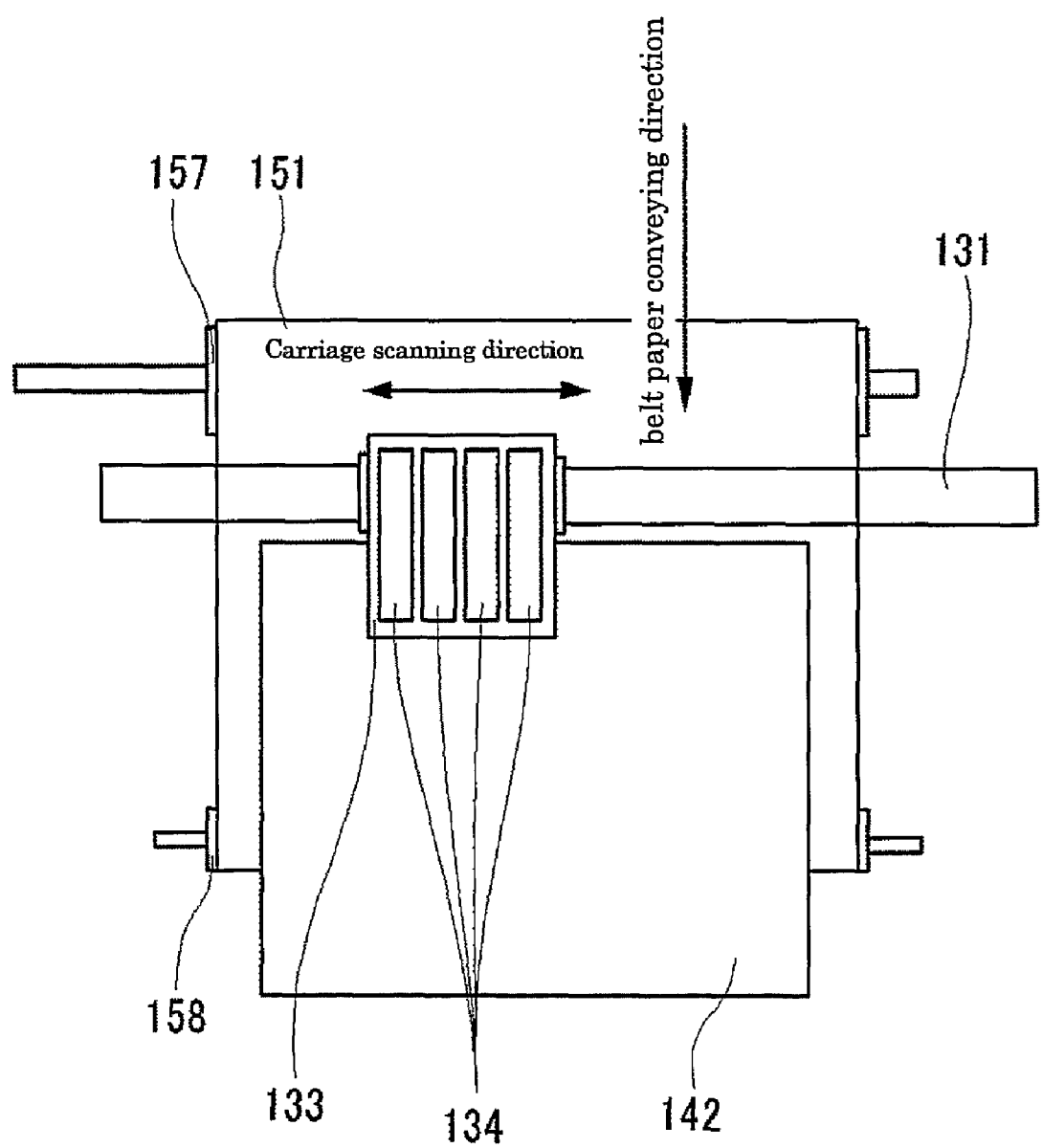
FIG. 6 is a schematic enlarged view illustrating an example of the ink-jet head in accordance with the invention.

An operation unit (105) such as operation keys or a display device is disposed on the upper surface of the ink cartridge locating unit (104). The ink cartridge locating unit (104) has a front cover (115) that can be opened and closed to install and remove the ink cartridge (200). In FIG. 4, the reference numeral 111 stands for an upper cover, 112, a front surface, and 115, a front cover.

The ink-jet head to which the invention is applied will be described below.

Figure 7:
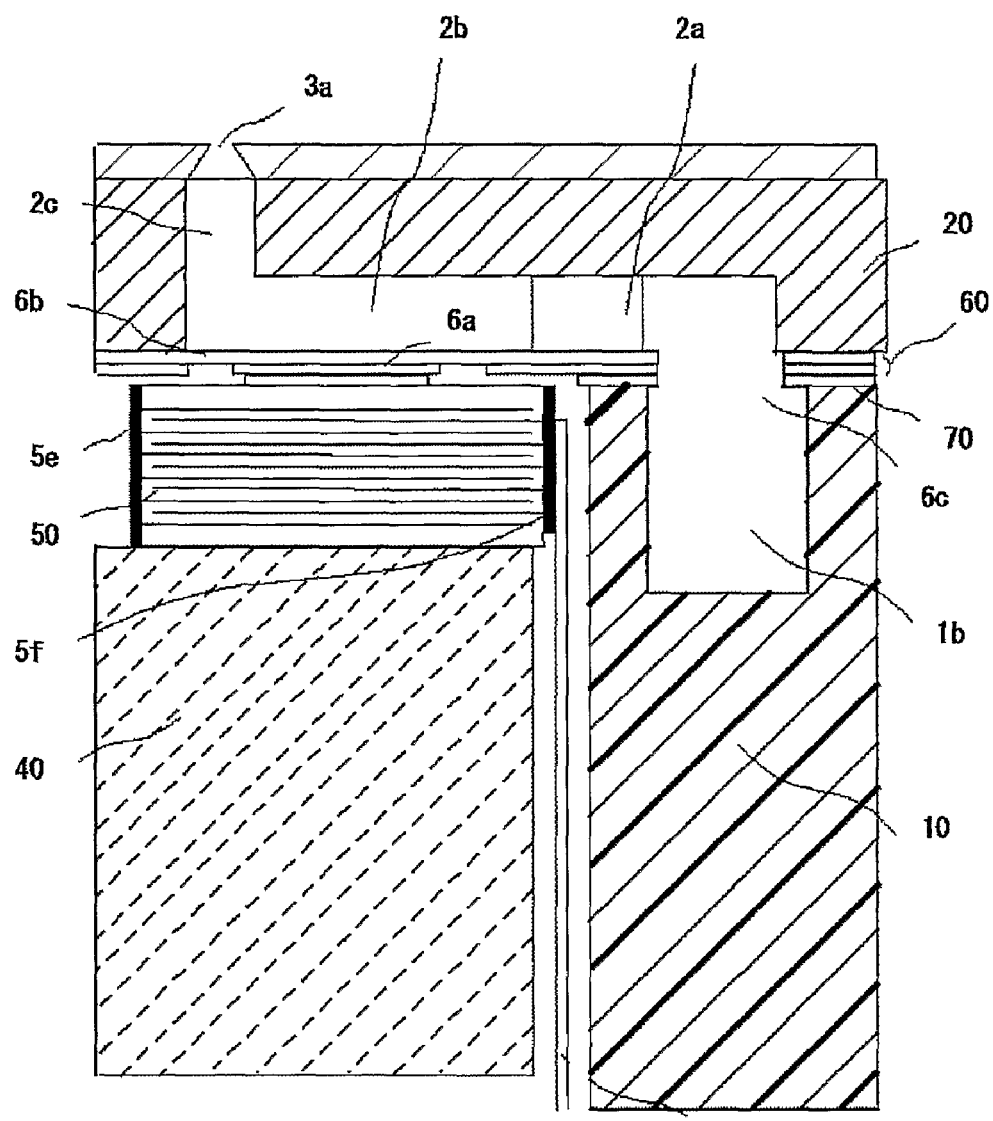
FIG. 7 is an enlarged view of the main component illustrating an example of the inkjet head in accordance with the invention.
Figure 8:
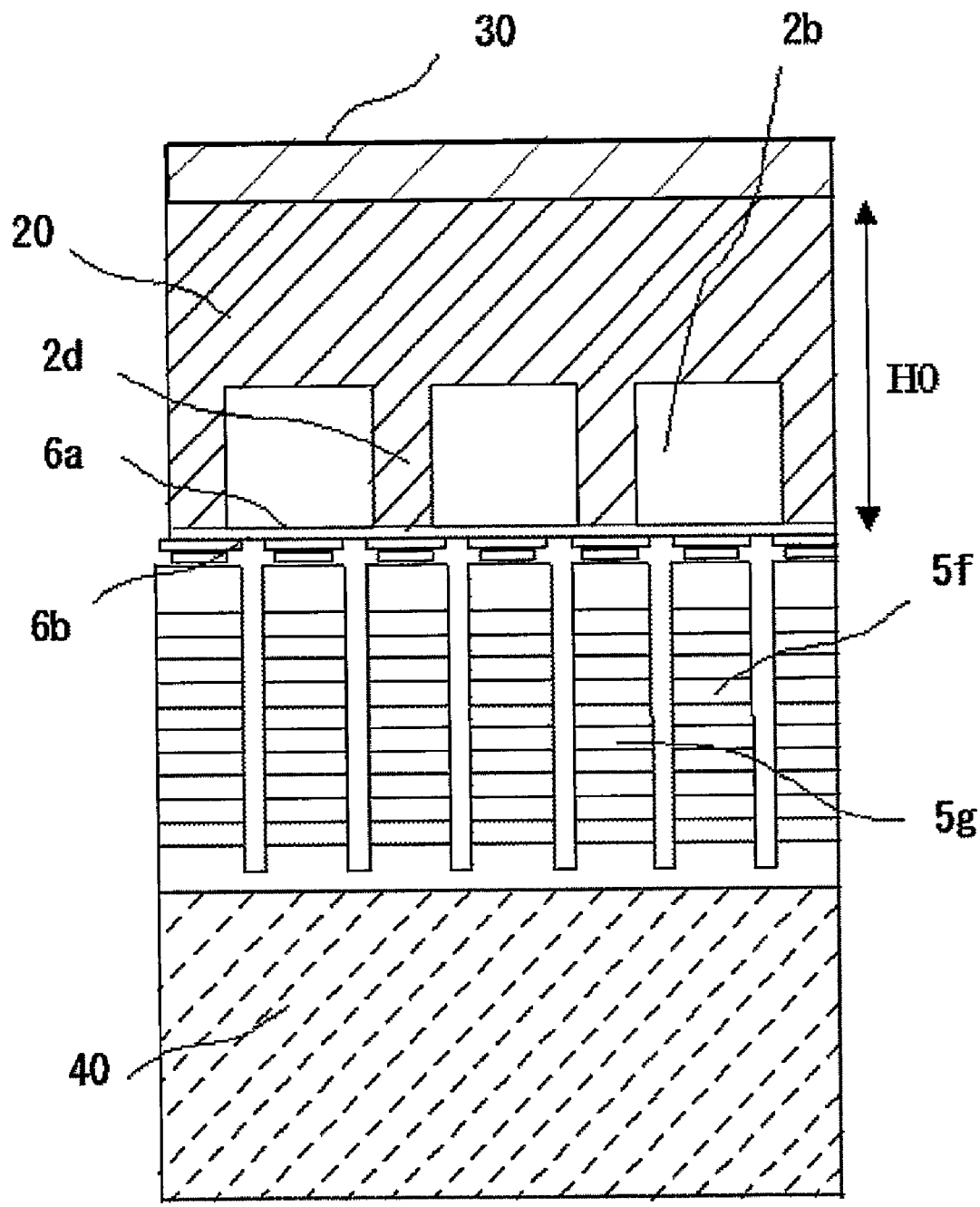
FIG. 8 is an enlarged view of the main portion illustrating an example of the ink-jet head in accordance with the invention.
Figure 9:
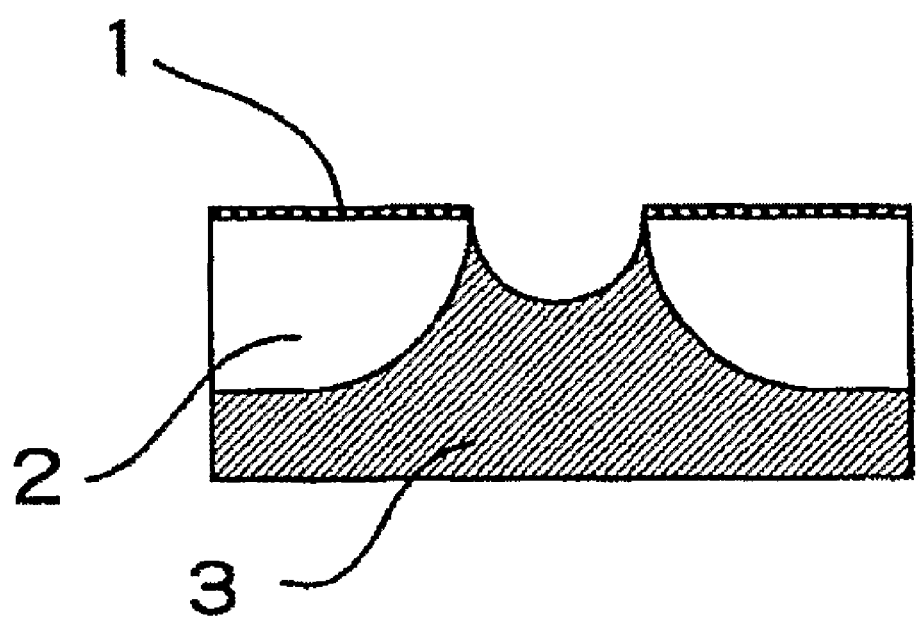
FIG. 9 is a cross-sectional view of an ink-jet head nozzle produced in accordance with the invention.

FIG. 7 is an enlarged view of the main portion of the ink-jet head of one embodiment of the invention. FIG. 8 is an enlarged sectional view of the main portion in the direction between the channels of the head.

The ink-jet head contains a frame (10) having formed therein grooves serving as an ink supply port (not shown in the figure) and a liquid passage chamber (1b), a fluid resistance portion (2a), a channel plate (20) having formed therein a groove serving as a pressurized liquid chamber (2b) and a communication port (2c) that communicates with a nozzle (3a), a nozzle plate that forms the nozzle (3a), a vibration plate (60) having a convex portion (6a), a diaphragm portion (6b), and an ink inflow port (6c), laminated piezoelectric elements (50) bonded via an adhesive layer (70) to the vibration plate (60), and a base (40) that fixes the laminated piezoelectric elements (50).

The base (40) is made from a barium titanate ceramic, and the laminated piezoelectric elements (50) are disposed and bonded in two rows.

<Explanation of Relationship Between Nozzle Plate, Ink, and Medium>

When an ink is used that has a comparatively low surface tension, such as the ink employed in the image forming method in accordance with the invention, it is preferred that the nozzle plate excel in water repellency and ink repellency. This is because by using the nozzle plate that excels in water repellency and ink repellency, it is possible to form normally a meniscus even of the ink with a low surface tension, thereby enabling effective formation (conversion into droplets) of ink droplets. Where the meniscus is normally formed, the ink is prevented from stretching unidirectionally during spraying. As a result, the ink spraying trajectory is hardly curved and an image with a high dot position accuracy can be obtained.

Further, when printing is performed on a medium with low absorption ability, as the medium (paper) used in the ink media set in accordance with the invention, the image quality strongly depends on the dot position accuracy. In other words, because the ink spreads poorly on the medium with low absorption ability, even when the dot position accuracy decreases slightly zones in which the ink has not been embedded, that is, white spots, appear on the medium. These zones cause image density unevenness and decrease in image density, thereby causing degradation of image quality.

By contrast, with the ink-jet head used in accordance with the invention, a high dot position accuracy is attained even when the ink with a low surface tension is used. Therefore, because the ink can be embedded in the medium even when the medium with low absorption ability is used, the image density unevenness and decrease in image density are prevented and a printout with high image quality can be obtained.

<Ink Repellent Layer>
(Surface Roughness)

The surface roughness Ra of the ink repellent layer used in accordance with the invention is preferably 0.2 μm or less. With the surface roughness Ra equal to or less than 0.2 μm, the wiping residue can be reduced.

FIG. 9 and FIGS. 10A to 10C are cross-sectional views of the ink-jet head nozzle produced in accordance with the invention.

In the present embodiment, the nozzle plate (2) that is the substrate of the ink-jet head, is produced by Ni electrocasting, and an ink repellent film (1), which is a silicone resin film with a thickness of 0.1 μm or more, is formed on the surface of the nozzle plate. The surface roughness of the ink repellent film Ra is equal to or less than 0.2. The thickness of the ink repellent film (1) is preferably 0.5 μm or more.

Figure 10A:
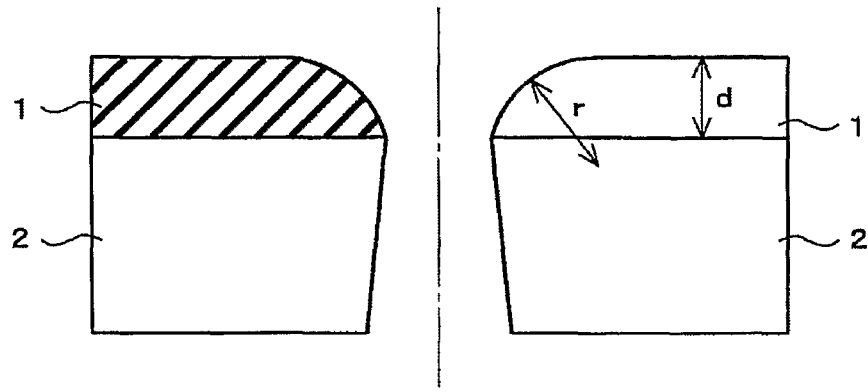
FIGS. 10A to 10C are another cross-sectional views of ink-jet head nozzles produced in accordance with the invention.
Figure 10B:
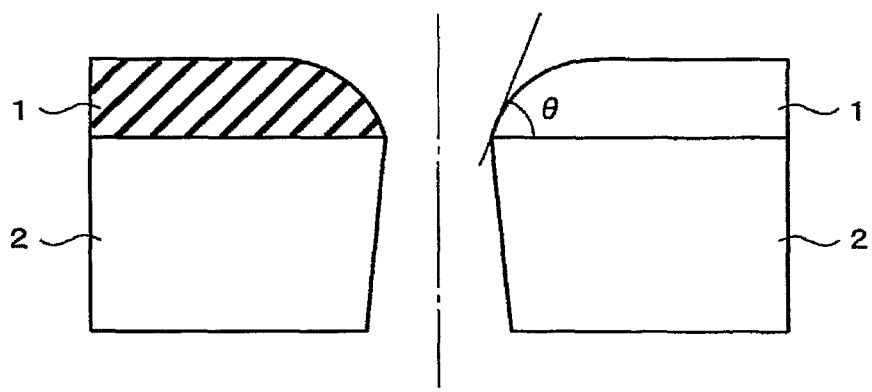
Figure 10C:
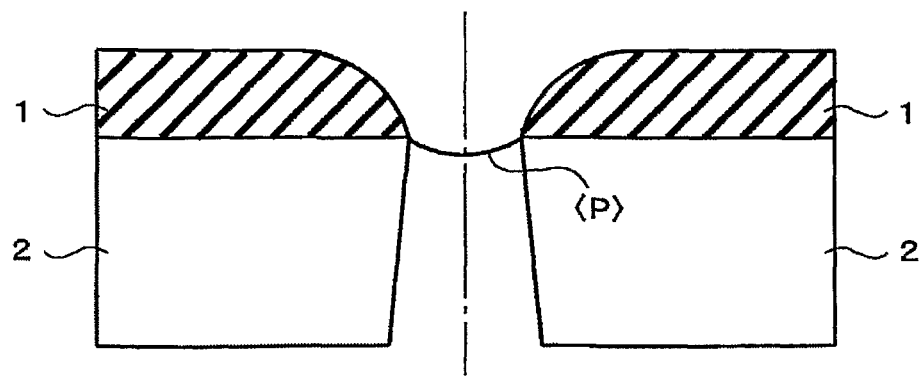
Figure 11A:
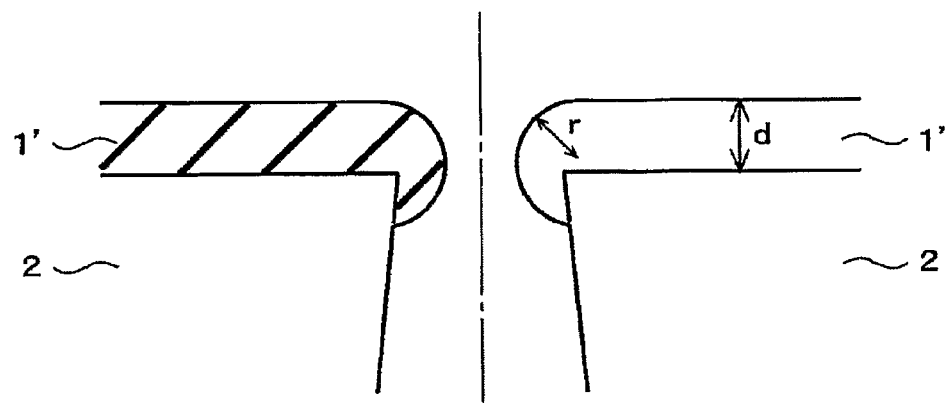
FIG. 11A to 11C are yet another cross-sectional views of ink-jet head nozzles produced in accordance with the invention.
Figure 11B:
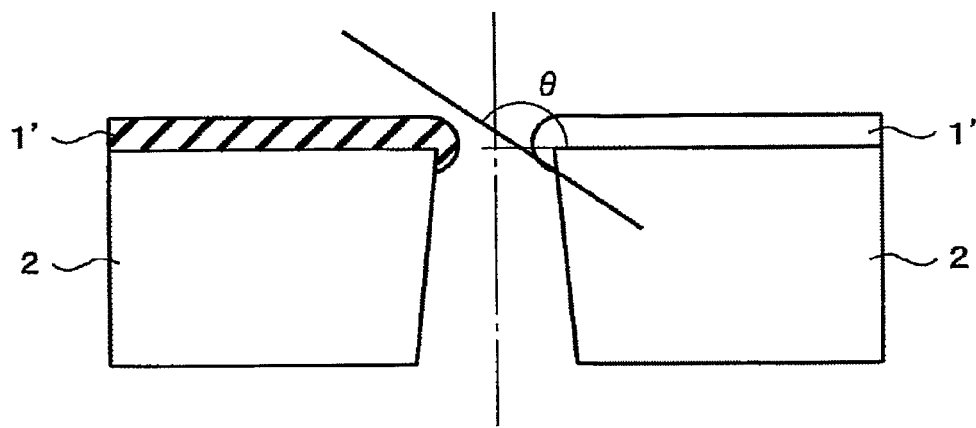
Figure 11C:
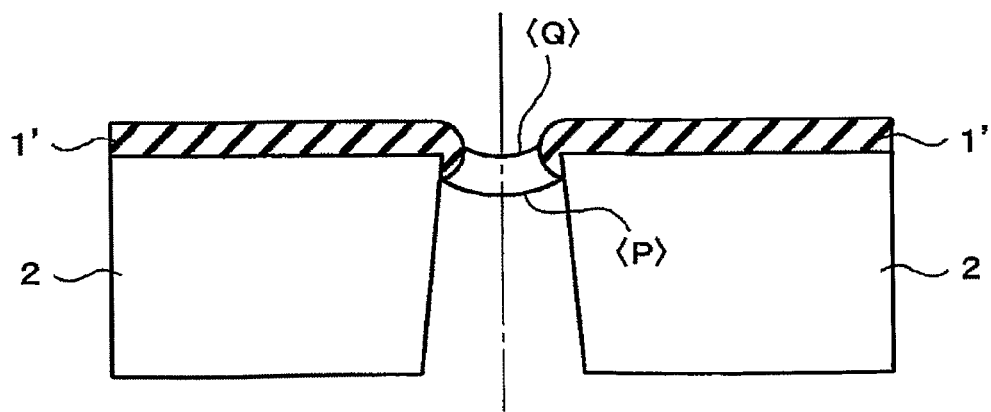

When the ink (3) is loaded, as shown in FIG. 10C, a meniscus (liquid surface) P is formed in the boundary portion of the ink repellent film (1) composed of the silicon resin film and the nozzle plate (2).

<Material of Ink Repellent Layer>

Any material can be used for the ink repellent layer, provided that it repels ink. Specific examples of suitable materials include fluorine-containing water repellent materials and silicone-containing water repellent materials.

A variety of fluorine-containing water repellent materials are known. Here, the necessary water repellency is obtained by vapor depositing a mixture of perfluoropolyoxethane and modified perfluoropolyoxethane (trade name: Optool DSX, manufactured by Daikin Industries, Ltd.) to a thickness of 1 Å to 30 Å. Experimental results demonstrated that no difference in water repellency and wiping endurance could be observed when the thickness of Optool DSX was 10 Å, 20 Å, and 30 Å. Therefore, from the standpoint of cost the preferred thickness is 1 Å to 20 Å. Further, a pressure-sensitive adhesive tape (124) obtained by coating a pressure-sensitive adhesive material on a resin film is pasted on the surface of the fluorine-containing water-repellent layer (123), thereby providing an enhancement function during excimer laser processing.

Further, a silicone-containing water repellent material can be also used.

Silicone-containing water-repellent material can be a liquid silicone resin or elastomer curable at room temperature, and an ink repellent film is preferably formed by coating on the substrate surface and allowing to stay in the air at room temperature to induce polymerization and curing.

The aforementioned silicone-containing water-repellent material may be also a liquid silicon resin or elastomer curable by heating, and the ink repellent film may be formed by coating on the substrate surface and curing by heating.

The aforementioned silicone-containing water-repellent material may be also a liquid silicon resin or elastomer curable by UV radiation, and the ink repellent film may be formed by coating on the substrate surface and curing by irradiation with UV radiation.

The viscosity of the silicone-containing water-repellent material is preferably 1,000 cp (centipoise) or less.

(Ink Recorded Matter)

The ink recorded matter that is recorded by the ink-jet recording method in accordance with the invention is an ink recorded matter in accordance with the invention. The ink recorded matter in accordance with the invention has an image formed by using an ink in the ink media set on the recording medium in the ink media set in accordance with the invention.

The recorded matter has high quality, demonstrates no bleeding, excels in stability with the passage of time, and can be advantageously used for a variety of applications as a material where a variety of symbols or images are recorded.

(Critical Surface Tension)

The critical surface tension of the ink repellent layer is preferably 5 mN/m to 40 mN/m, even more preferably 5 mN/m to 30 mN/m. Where the critical surface tension is more than 30 mN/m, the ink demonstrates excessive wetting of the nozzle plate in a long-term use. As a result of this phenomenon, where repeated printing is performed, the trajectory of the discharged ink is curved and abnormal droplets are formed. Further, where the critical surface tension exceeds 40 mN/m, the nozzle plate is excessively wetted with the ink from the very beginning. As a result of this phenomenon, the trajectory of the discharged ink is curved and abnormal droplets are formed from the very beginning.

The ink repellent material described in Table 1 was coated on an aluminum substrate and dried by heating to produce a nozzle plate with an ink repellent layer attached thereto. The results obtained in measuring the critical surface tension of the ink repellent layer are shown in Table 1.

The critical surface tension can be measured by a Zisma method. In other words, a liquid with a known surface tension is dropped on an ink repellent layer, the contact angle θ thereof is measured, the surface tension of the liquid is plotted against the x axis, cos θ is plotted against the y axis, and a line descending to the right is obtained. The surface tension in a point where this line (Zisman Plot) becomes Y=1 (θ=0) can be calculated as the critical surface tension γc. The critical surface tension can be also found by using other methods such as Fowkes method, Owens and Wendt method or Van Oss method.

An ink jet head was produced by using the nozzle plate provided with an ink repellent layer in the same manner as in the above-described head production method. An ink was sprayed with the ink-jet head by using the cyan inks of the below-described Manufacturing Example 1. The results obtained in jetting the ink were observed with a video camera. Normal formation of droplets was confirmed with all the nozzle plates and good discharge stability was confirmed. The cyan inks of Manufacturing Example 1 produced the following results.

TABLE 1

| Manufacturer | Trade name | Critical surface tension (mN/m) | Discharge stability |
| --- | --- | --- | --- |
| Toray - Dow Corning | SR2411 | 21.6 | Good |
| Shin-Etsu Chemical Industries | KBM7803 | 16.9 | Good |
| Shin-Etsu Chemical Industries | KP801M | 6.6 | Good |

EXAMPLES

Examples of the invention are described below, but the invention is not limited to these Examples. All percentages and parts are by mass unless indicated otherwise.
—Preparation of Pigment Ink—

Manufacturing Example 1

Cyan

—Preparation of Fine Polymer Particle Dispersion Containing Copper Phthalocyanine Pigment—

The inside of a 1 L flask equipped with a mechanical stirrer, a thermometer, a nitrogen gas introducing tube, a reflux pipe, and a dropping funnel was sufficiently purged with nitrogen. Then, 11.2 g of styrene, 2.8 g of acrylic acid, 12.0 g of lauryl methacrylate, 4.0 g of polyethylene glycol methacrylate, 4.0 g of styrene macromer (trade name: AS-6, manufactured by Toa Gosei Kabushiki Kaisha), and 0.4 g of mercaptoethanol were charged into the flask, and the temperature was raised to 65° C. Then, a mixed solution containing 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer (trade name: AS-6, manufactured by Toa Gosei Kabushiki Kaisha), 3.6 g of mercaptoethanol, 2.4 g of azobisdimethyl valeronitrile and 18 g of methyl ethyl ketone was dropped into the flask over 2.5 h.

Upon completion of dropwise addition, a mixed solution of 0.8 g of azobisdimethyl valeronitrile and 18 g of methyl ethyl ketone was dropped into the flask over 0.5 h. After maturing for 1 h at a temperature of 65° C., 0.8 g of azobisdimethyl valeronitrile was added and the maturing was continued for 1 h. Upon completion of reaction, 364 g of methyl ethyl ketone was added to the flask, and 800 g of a polymer solution with a concentration of 50 mass % was obtained. Part of the polymer solution was then dried and analyzed by gel permeation chromatography (standard: polystyrene, solvent: tetrahydrofuran). The weight-average molecular weight (Mw) was 15,000.

Then, 28 g of the polymer solution obtained, 26 g of copper phthalocyanine pigment, 13.6 g of an aqueous solution of potassium hydroxide with a concentration of 1 mol/L, 20 g of methyl ethyl ketone, and 30 g of ion exchange water were thoroughly stirred. A total of 20 cycles of kneading were then performed using a three-roll mill (trade name: NR-84A, manufactured by Noritake Company). The paste obtained was charged into 200 g of ion exchange water and thoroughly stirred. Methyl ethyl ketone was water were then removed using an evaporator, and 160 g of polymer fine particle dispersion of blue color with an amount of solids of 20.0 mass % was obtained. The average particles size (D50%) of the obtained polymer fine particles that was measured with a particle size distribution meter (Microtrack UPA, manufactured by Nikkiso Co.) was 93 nm.

Manufacturing Example 2

Magenta

—Preparation of Fine Polymer Particle Dispersion Containing Dimethylquinacridone Pigment—

A red purple polymer fine particle dispersion was prepared in the same manner as in Manufacturing Example 1, except that the copper phthalocyanine pigment of Manufacturing Example 1 was replaced with pigment Pigment Red 122.

The average particles size (D50%) of the obtained polymer fine particles that was measured with a particle size distribution meter (Microtrack UPA, manufactured by Nikkiso Co.) was 127 nm.

Manufacturing Example 3

Yellow

—Preparation of Fine Polymer Particle Dispersion Containing Monoazo Yellow Pigment—

A yellow polymer fine particle dispersion was prepared in the same manner as in Manufacturing Example 1, except that the copper phthalocyanine pigment of Manufacturing Example 1 was replaced with pigment Pigment Yellow 74.

The average particles size (D50%) of the obtained polymer fine particles that was measured with a particle size distribution meter (Microtrack UPA, manufactured by Nikkiso Co.) was 76 nm.

Manufacturing Example 4

—Preparation of Carbon Black Polymer Fine Particle Dispersion—

A black polymer fine particle dispersion was prepared in the same manner as in Manufacturing Example 1, except that the copper phthalocyanine pigment of Manufacturing Example 1 was replaced with carbon black (FW100, manufactured by Degussa Co.).

The average particles size (D50%) of the obtained polymer fine particles that was measured with a particle size distribution meter (Microtrack UPA, manufactured by Nikkiso Co.) was 104 nm.

Ink compositions were then manufactured by using the polymer fine particle dispersions and carbon black dispersions obtained in Manufacturing Examples 1 to 4.

Manufacturing Example 5

—Preparation of Cyan Ink Composition 1—

A total of 20.0 mass % polymer fine particle dispersion containing copper phthalocyanine of Manufacturing Example 1, 23.0 mass % 3-methyl-1,3-butanediol, 8.0 mass % glycerin, 2.0 mass % 2-ethyl-1,3-hexanediol, 2.5 mass % FS-300 (manufactured by Du Pont Corp.), 0.2 mass % Proxel LV (manufactured by Avecia Co.), 0.5 mass % of 2-amino-2-ethyl-1,3-propanediol, and an appropriate amount of ion-exchange water were added up to obtain 100 mass %. Filtration was then carried out with a membrane filter with an average pore diameter of 0.8 μm. The content ratio of solids was then adjusted to 12 mass % with ion-exchange water. An ink composition was thus prepared. The viscosity of the obtained ink composition at a temperature of 25° C. was 9 mPa·s and the surface tension was 25 mN/m. The viscosity was measured at 25° C. with a viscometer (rotary viscometer R500, manufactured by Toki Sangyo Co., Ltd.).

Manufacturing Example 6

—Preparation of Magenta Ink Composition 1—

A total of 20.0 mass % polymer fine particle dispersion containing dimethylquinacridone of Manufacturing Example 2, 22.5 mass % 3-methyl-1,3-butanediol, 9.0 mass % glycerin, 2.0 mass % 2-ethyl-1,3-hexanediol, 2.5 mass % FS-300 (manufactured by Du Pont Corp.), 0.2 mass % Proxel LV (manufactured by Avecia Co.), 0.5 mass % of 2-amino-2-ethyl-1,3-propanediol, and an appropriate amount of ion-exchange water were added to obtain 100 mass %. Filtration was then carried out with a membrane filter with an average pore diameter of 0.8 μm. The content ratio of solids was then adjusted to 12 mass % with ion-exchange water. An ink composition was thus prepared. The viscosity of the obtained ink composition at a temperature of 25° C. was 9 mPa·s and the surface tension was 25 mN/m.

Manufacturing Example 7

—Preparation of Yellow Ink Composition 1—

A total of 20.0 mass % polymer fine particle dispersion containing monoazo yellow pigment of Manufacturing Example 3, 24.5 mass % 3-methyl-1,3-butanediol, 8.0 mass % glycerin, 2.0 mass % 2-ethyl-1,3-hexanediol, 2.5 mass % FS-300 (manufactured by Du Pont Corp.), 0.2 mass % Proxel LV (manufactured by Avecia Co.), 0.5 mass % of 2-amino-2-ethyl-1,3-propanediol, and an appropriate amount of ion-exchange water were added to obtain 100 mass %. Filtration was then carried out with a membrane filter with an average pore diameter of 0.8 μm. The content ratio of solids was then adjusted to 12 mass % with ion-exchange water. An ink composition was thus prepared. The viscosity of the obtained ink composition at a temperature of 25° C. was 9 mPa·s and the surface tension was 25 mN/m.

Manufacturing Example 8

—Preparation of Black Ink Composition 1—

A total of 20.0 mass % carbon black dispersion of Manufacturing Example 4, 22.5 mass % 3-methyl-1,3-butanediol, 7.5 mass % glycerin, 2.0 mass % 2-pyrrolidone, 2.0 mass % 2-ethyl-1,3-hexanediol, 2.0 mass % R—(OCH$_2$CH$_2$)$_n$OH (in the formula R stands for an alkyl group having 12 carbon atoms; n=9), 0.2 mass % Proxel LV (manufactured by Avecia Co.), 0.5 mass % of 2-amino-2-ethyl-1,3-propanediol, and an appropriate amount of ion-exchange water were added to obtain 100 mass %. Filtration was then carried out with a membrane filter with an average pore diameter of 0.8 μm. The content ratio of solids was then adjusted to 12 mass % with ion-exchange water. An ink composition was thus prepared. The viscosity of the obtained ink composition at a temperature of 25° C. was 9 mPa·s and the surface tension was 25 mN/m.

—Manufacture of Source Paper—

Manufacturing Example 9

| Fabrication of Substrate 1 | |
|---|---|
| LBKP | 80 parts by mass |
| NBKP | 20 parts by mass |
| Lightweight calcium carbonate (trade name: TP-121, manufactured by Okutama Kogyo Kabushiki Kaisha) | 10 parts by mass |
| Aluminum sulfate | 1.0 part by mass |
| Amphoteric starch (trade name: Cato 3210, manufactured by Japan NSC Co., Ltd.) | 1.0 part by mass |
| Neutral rosin sizing agent (trade name: NeuSize M-10, manufactured by Harima Kasei Kabushiki Kaisha) | 0.3 parts by mass |
| Yield improving agent (trade name: NR-11LS, manufactured by HYMO Co., Ltd.) | 0.02 parts by mass |

The 0.3 mass % slurry of the above-described composition was processed in a long-net papermaking machine and finish processed in a machine calender to produce a substrate 1 with a basis weight of 79 g/m$^2$. In the size pressing step of the papermaking process, an aqueous solution of oxidized starch was applied such that the amount of deposited solids is 1.0 g/m$^2$ for one side.

Manufacturing Example 10

A cyan ink was prepared in the same manner as in Manufacturing Example 5, except that FS300 was removed from the formulation in Manufacturing Example 5. The surface tension of the ink was 42 mN/m.

Manufacturing Example 11

An ink having the content of solids of 33 mass % was prepared by heating the formulation in Manufacturing Example 5 at 40° C. for 8 hours. The viscosity of the ink was 32 mN/s.

Manufacturing Example 12

A pigment in which a carboxylic acid group was introduced was prepared by subjecting C.I. pigment cyan 15:3 as a cyan pigment to low-temperature plasma treatment. The obtained pigment was dispersed in ion-exchange water and then desalting and concentration were then performed with an ultrafiltration membrane to obtain a cyan pigment dispersion with a pigment concentration of 20%.

—Preparation of Cyan Ink Composition 2—

A total of 20.0 mass % the obtained cyan pigment dispersion, 23.0 mass % 3-methyl-1,3-butanediol, 8.0 mass % glycerin, 2.0 mass % 2-ethyl-1,3-hexanediol, 2.5 mass % FS-300 (manufactured by Du Pont Corp.), 0.2 mass % Proxel LV (manufactured by Avecia Co.), 0.5 mass % of 2-amino-2-ethyl-1,3-propanediol, and an appropriate amount of ion-exchange water were added up to obtain 100 mass %. Filtration was then carried out with a membrane filter with an average pore diameter of 0.8 µm. The content ratio of solids was then adjusted to 12 mass % with ion-exchange water. An ink composition was thus prepared. The viscosity of the obtained ink composition at a temperature of 25° C. was 9 mPa·s and the surface tension was 25 mN/m. The viscosity was measured at 25° C. with a viscometer (rotary viscometer R500, manufactured by Toki Sangyo Co., Ltd.).

Example 1

A total of 70 parts of kaolin with a ratio of particles with a diameter equal to or less than 2 µm of 97 mass % and 30 parts of heavy calcium carbonate with an average particle diameter of 1.1 µm as a pigment, 8 parts of styrene-butadiene copolymer emulsion with a glass transition temperature (Tg) of −5° C. and 1 part of phosphated starch as a binder, and 0.5 parts of calcium stearate as an additive were added to the prepared substrate 1 and then water was added to prepare a coating liquid with a concentration of solids of 60%.

The coating liquid was coated by using a blade coater on both surfaces of the above-described source paper to obtain a thickness of the coating layer on one side of 5 µm, and the coating was hot-air dried. Then, super-calendering was performed to obtain a recording paper 1 in accordance with the invention.

An ink set 1 of black, yellow, magenta, and cyan inks of the compositions manufactured in Manufacturing Examples 1 to 8 was prepared, and printing with an image resolution of 600 dpi was carried out by using the obtained ink set 1 and the recording paper 1 and employing a drop-on-demand experimental printer having 384 nozzles with a nozzle resolution of 300 dpi. The size of a large drop was 20 pL, the size of a medium drop was 10 pL, and the size of a small drop was 2 pL. The deposited ink amount was regulated by regulating the total amount of secondary colors to 140%. When the printing was performed, a solid image and text were printed at an ink amount of 12 g/m$^2$ for a square area of 300 dot each side. Image reliability was evaluated for the image obtained. The results are shown in Tables 2-1 and 2-2.

The evaluation results denoted by symbol "C" related to inadequate medium.

Example 2

Printing was carried out in the same manner as in Example 1, except that POD Gloss Coat (manufactured by Oji Paper Co., Ltd.) was used as the medium Example 3

Printing was carried out in the same manner as in Example 1, except that UPM Digifinesee Gloss (manufactured by UPM Co., Ltd.) was used as the medium.

Example 4

Printing was carried out in the same manner as in Example 1, except that Color Copy Gloss (manufactured by International Paper Co., Ltd.) was used as the medium.

Example 5

Printing was carried out in the same manner as in Example 1, except that Avery Laser Glossy (manufactured by Avery Co.) was used as the medium.

Example 6

Printing was carried out in the same manner as in Example 1, except that Color Copy coated glossy (manufactured by Mondi Co., Ltd.) was used as the medium.

Example 7

Printing was carried out in the same manner as in Example 1, except that Exact Gloss (manufactured by Wausau Paper Co.) was used as the medium.

Example 8

Printing was carried out in the same manner as in Example 1, except that SA Kanefuji+ (manufactured by Oji Paper Co., Ltd.) was used as the medium.

Example 9

Printing was carried out in the same manner as in Example 1, except that OK Top Coat+ (manufactured by Oji Paper Co., Ltd.) was used as the medium.

Example 10

Printing was carried out in the same manner as in Example 1, except that U-Light (manufactured by Nippon Paper Industries Co., Ltd.) was used as the medium.

Example 11

Printing was carried out in the same manner as in Example 1, except that Neptune (manufactured by Nippon Paper Industries Co., Ltd.) was used as the medium.

Example 12

Printing was carried out in the same manner as in Example 1, except that Aurora Coat (manufactured by Nippon Paper Industries Co., Ltd.) was used as the medium.

Example 13

Printing was carried out in the same manner as in Example 1, except that α-Mat (manufactured by Hokuetsu Paper Mills, Ltd.) was used as the medium.

Example 14

Printing was carried out in the same manner as in Example 1, except that Mirror Coat Platinum (manufactured by Oji Paper Co., Ltd.) was used as the medium.

Example 15

Printing was carried out in the same manner as in Example 1, except that Espri Coat Lotus (manufactured by Nippon Paper Industries Co., Ltd.) was used as the medium.

Example 16

Printing was carried out in the same manner as in Example 1, except that Espri Coat C (manufactured by Nippon Paper Industries Co., Ltd.) was used as the medium.

Example 17

Printing was carried out in the same manner as in Example 1, except that New Mariesuto W (manufactured by Hokuetsu Paper Mills, Ltd.) was used as the medium.

Example 18

Printing was carried out in the same manner as in Example 1, except that Picasso C (manufactured by Gojo Paper Mfg. Co., Ltd.) was used as the medium.

Example 19

Printing was carried out in the same manner as in Example 1, except that Laser High Gloss (manufactured by SMART Papers Co., Ltd.) was used as the medium.

Example 20

Printing was carried out in the same manner as in Example 1, except that POD Gloss Coat (manufactured by Oji Paper Co., Ltd.) was used as the medium and that the amount of ink was set to 14 g/m$^2$.

Example 21

A total of 50 parts of kaolin with a ratio of particles with a diameter equal to or less than 2 μm of 97 mass % and 30 parts of heavy calcium carbonate with an average particle diameter of 1.1 μm, 20 parts of silica with an average particle diameter of 2.0 μm as a pigment, 8 parts of styrene-butadiene copolymer emulsion with a glass transition temperature (Tg) of −5° C. and 1 part of phosphated starch as a binder, and 0.5 parts of calcium stearate as an additive were added to the prepared substrate 1 and then water was added to prepare a coating liquid with a concentration of solids of 60%.

The coating liquid was coated by using a wire bar on both surfaces of the above-described source paper to obtain a thickness of the coating layer on one side of 5 μm, and the coating was hot-air dried. Then, super-calendering was performed to obtain a recording paper 2 in accordance with the invention. Printing was carried out in the same manner as in Example 1, except that the recording paper 2 was used.

Example 22

Printing was carried out in the same manner as in Example 1, except that the cyan ink manufactured in Manufacturing Example 10 was used. The surface tension of the ink was 42 mN/m.

Example 23

Printing was carried out in the same manner as in Example 1, except that the cyan ink manufactured in Manufacturing Example 11 was used.

Comparative Example 1

Printing was carried out in the same manner as in Example 1, except that photographic paper Entry (manufactured by Epson Corp.) was used as the medium.

Comparative Example 2

Printing was carried out in the same manner as in Example 1, except that photographic paper Crispier (manufactured by Epson Corp.) was used as the medium.

Comparative Example 3

An aqueous solution of 10% acetic acid was coated on the recording paper 1 so as to obtain a recording paper 3 in which pH of the paper surface was adjust to 7. Printing was carried out in the same manner as in Example 1, except that the recording paper 3 was used.

Comparative Example 4

A total of 30 parts of kaolin with a ratio of particles with a diameter equal to or less than 2 μm of 97 mass % and 30 parts of heavy calcium carbonate with an average particle diameter of 1.1 μm, 40 parts of silica with an average particle diameter of 2.0 μm as a pigment, 8 parts of styrene-butadiene copolymer emulsion with a glass transition temperature (Tg) of −5° C. and 1 part of phosphated starch as a binder, and 0.5 parts of calcium stearate as an additive were added to the prepared substrate 1 and then water was added to prepare a coating liquid with a concentration of solids of 60%.

The coating liquid was coated by using a wire bar on both surfaces of the above-described source paper to obtain a thickness of the coating layer on one side of 5 μm, and the coating was hot-air dried. Then, super-calendering was performed to obtain a recording paper 4 in accordance with the invention. Printing was carried out in the same manner as in Example 1, except that the recording paper 4 was used.

Comparative Example 5

Printing was carried out in the same manner as in Example 1, except that the Cyan Ink Composition 2 in Manufacturing Example 12 was used as a cyan ink.

Comparative Example 6

Printing was carried out in the same manner as in Example 1, except that POD Gloss Coat (manufactured by Oji Paper Co., Ltd.) was used and that the deposited ink amount was set to 15.5 g/m$^2$.

The media used in Examples 1 to 23 and Comparative Examples 1 to 6 are described below.

POD Gloss Coat: a coated paper containing cellulose pulp as the main component and having a coat layer containing a pigment on a substrate. The deposition amount is 10 g/m$^2$, as solids, on one surface.

UPM Digifinesee Gloss: a coated paper containing cellulose pulp as the main component and having a coat layer containing a pigment on a substrate.

Color Copy Gloss: a coated paper containing cellulose pulp as the main component and having a coat layer containing a pigment on a substrate.

Avery Laser Glossy: a coated paper containing cellulose pulp as the main component and having a coat layer containing a pigment on a substrate.

Color Copy coated glossy: a coated paper containing cellulose pulp as the main component and having a coat layer containing a pigment on a substrate.

Exact Gloss: a coated paper containing cellulose pulp as the main component and having a coat layer containing a pigment on a substrate.

SA Kanefuji+: a coated paper containing cellulose pulp as the main component and having a coat layer containing a pigment on a substrate. The deposition amount is 20 g/m$^2$, as solids, on one surface.

OK Top Coat+: a coated paper containing cellulose pulp as the main component and having a coat layer containing a pigment on a substrate. The deposition amount is 10 g/m$^2$, as solids, on one surface.

U-light: a coated paper containing cellulose pulp as the main component and having a coat layer containing a pigment on a substrate. The deposition amount is 10 g/m$^2$, as solids, on one surface.

Neptune: a coated paper containing cellulose pulp as the main component and having a coat layer containing a pigment on a substrate.

Aurora Coat: a coated paper containing cellulose pulp as the main component and having a coat layer containing a pigment on a substrate. The deposition amount is 10 g/m$^2$, as solids, on one surface.

α-Mat: a coated paper containing cellulose pulp as the main component and having a coat layer containing a pigment on a substrate.

Mirror Coat Platinum: a coated paper containing cellulose pulp as the main component and having a coat layer containing a pigment on a substrate.

Espri Coat Lotus: a coated paper containing cellulose pulp as the main component and having a coat layer containing a pigment on a substrate.

Espri Coat C: a coated paper containing cellulose pulp as the main component and having a coat layer containing a pigment on a substrate.

New Mariesuto W: a coated paper containing cellulose pulp as the main component and having a coat layer containing a pigment on a substrate.

Picasso C: a coated paper containing cellulose pulp as the main component and having a coat layer containing a pigment on a substrate.

Laser High Gloss: a coated paper containing cellulose pulp as the main component and having a coat layer containing a pigment on a substrate.

Photographic Paper Entry: a coated paper containing cellulose pulp as the main component and having a coat layer containing a pigment on a substrate.

Crispier: a coated paper containing cellulose pulp as the main component and having a coat layer containing a pigment on a substrate.

(Evaluation Items and Measuring Methods Thereof)
<Measurement of Transferred Amount of Pure Water with Dynamic Scanning Absorptometer>

The transferred amount of pure water was measured at 25° C., 50% RH by using the dynamic scanning absorptometer (D type, K350 series, manufactured by Kyowa Seiko Kabushiki Kaisha). The transferred amount at a contact time of 100 ms and a contact time of 400 ms was found by interpolation from the measured values of the transferred amount at a contact time close to these values of contact time.

Figure 12:
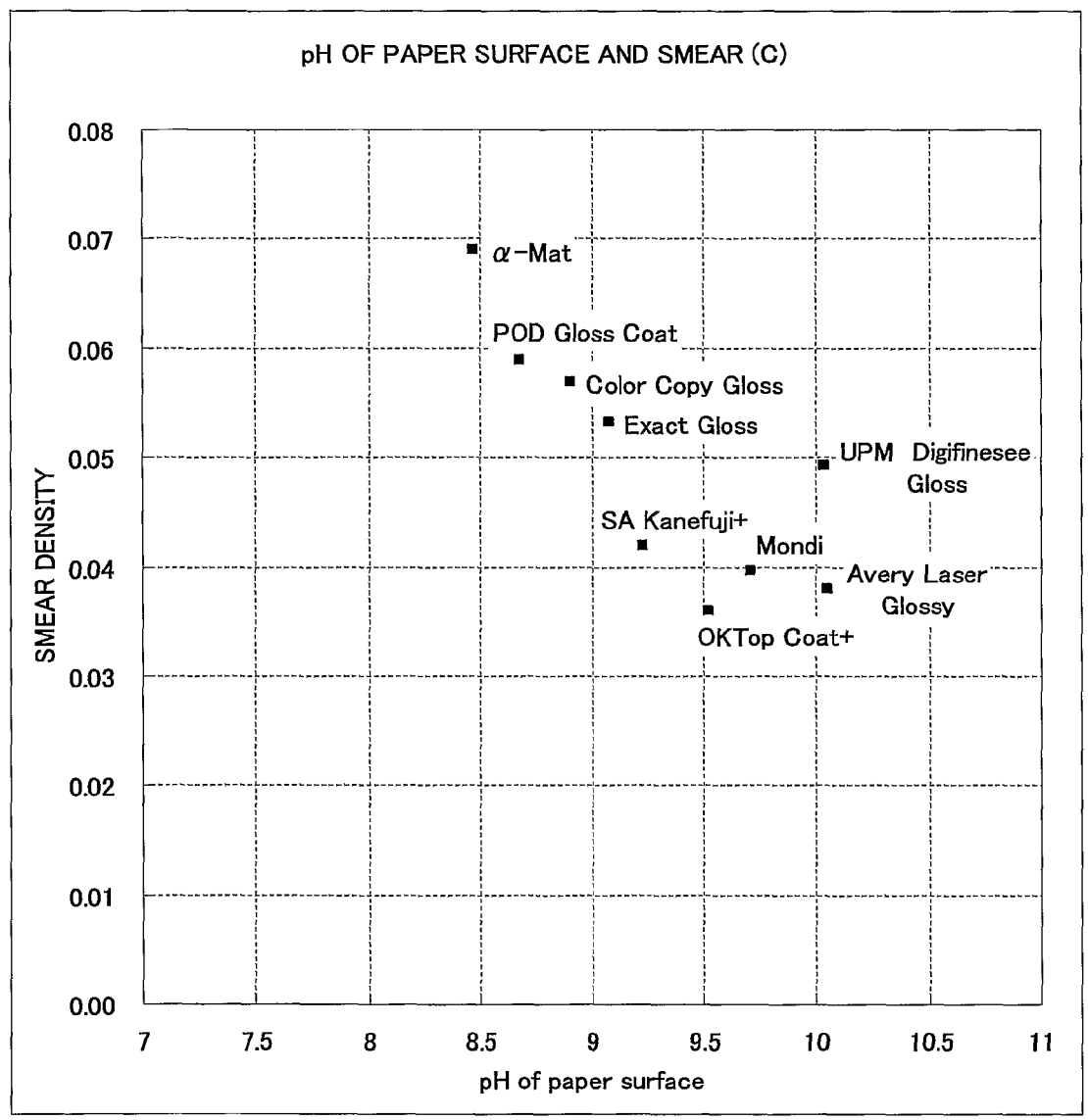
FIG. 12 is a plot in which the pH of paper surface is plotted against the abscissa and the smear concentration is plotted against the ordinate, this plot relating to a medium, from among the media of Examples, in which the amount of pure water transferred onto the medium after a contact time of 100 ms is more than 1 mL/m$^2$.

FIG. 12 is a plot relating to the medium, from among the media of the examples, in which the amount of pure water transferred into the medium after a contact time of 100 ms exceeds 1 mL/m$^2$. In this plot, the pH of the paper surface is plotted against the abscissa and the smear density is plotted against the ordinate.

Figure 13:
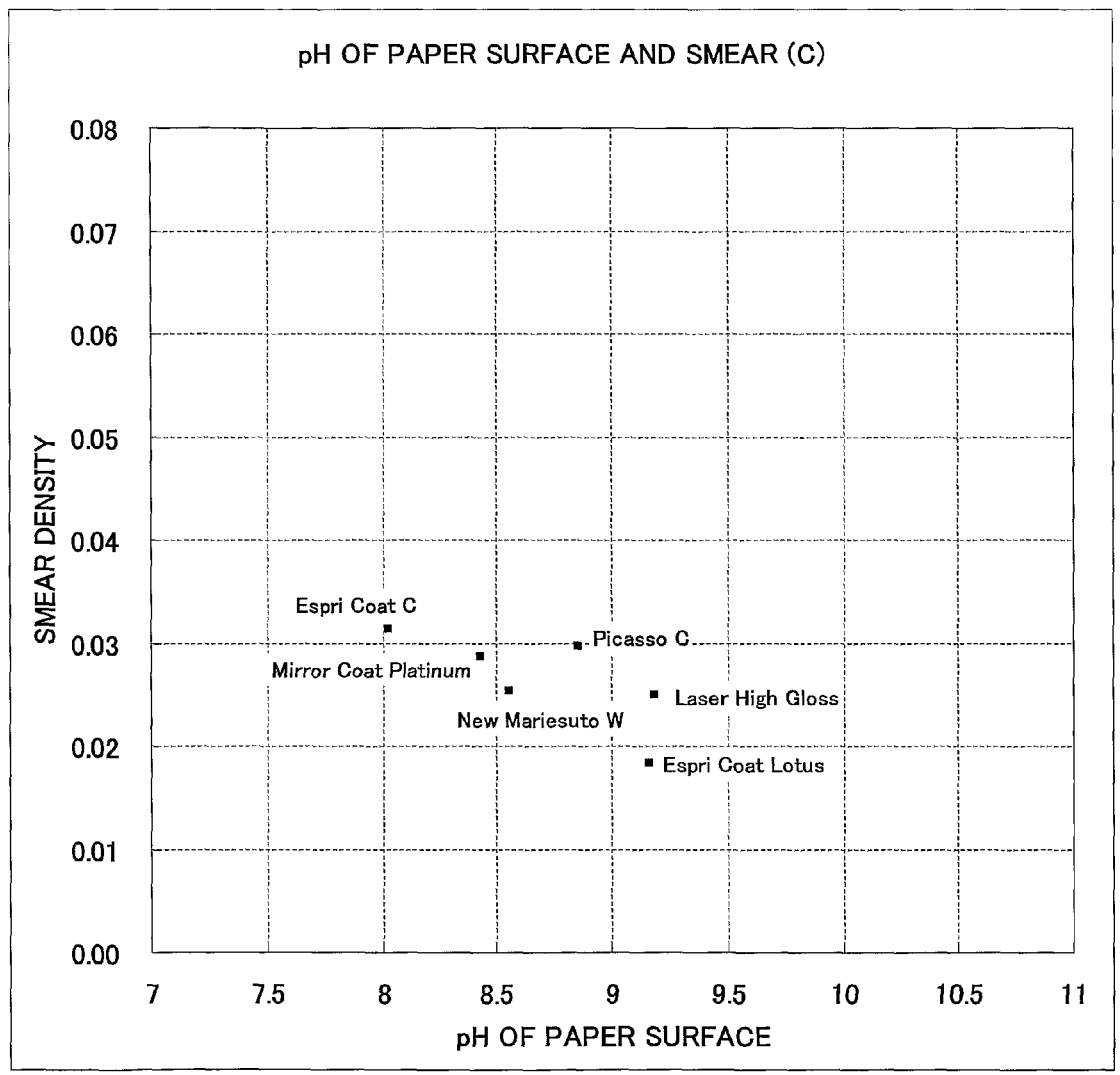
FIG. 13 is a plot in which the pH of paper surface is plotted against the abscissa, and the smear concentration is plotted against the ordinate, this plot relating to a medium, from among the media of Examples, in which the amount of pure water transferred onto the medium after a contact time of 100 ms is equal to or less than 1 mL/m$^2$.

FIG. 13 is a plot relating to the medium, from among the media of the examples, in which the amount of pure water transferred into the medium after a contact time of 100 ms is equal to or less than 1 mL/m$^2$. In this plot, the pH of the paper surface is plotted against the abscissa and the smear density is plotted against the ordinate.

In all the cases, the smear density is decreased and improved with the increase in the pH value of paper surface. Further, the improvement effect of smear density is higher where the transferred amount is equal to or less than 1 mL/m$^2$.

<Measurement of pH of Paper Surface>

Pure water, 0.1 mL, was dropped on surfaces of the media prepared in Examples and Comparative Examples, and the pH value of each paper surface was measured with a pH meter SKINCHECK (manufactured by HANNA instruments Co.) equipped with a flat sensor. The measured values were taken 30 sec after the pure water was dropped.

<C Ink Fixing Ability>

After 24 h of printing, a white cotton cloth (JIS L 0803, Cotton No. 3) was pasted with a two-side pressure sensitive adhesive foam tape (manufactured by 3M Co., #4016, t=1.6) onto a friction element in a clock meter (CM-1 type), 5 cycles of reciprocal rubbing was performed, and the concentration of colorant that adhered to the cotton cloth was measured with a spectral densitometer (Model-938, manufactured by X-Right Co., Ltd.) with respect to a cyan solid image portion of each image printout.

[Evaluation Criteria]
A: density 0.05 or less, level at which no problems arise in practical use.
B: density was 0.07 or less and 0.05 or more, level at which the printout still can be used.
C: density was equal to or more than 0.07, problem arise in practical use.

<Offset Ink Set Time>

A cyan ink (High-Unity Neo SOY, by Tokyo Ink MFG, Co., Ltd.), 0.8 cc, was solid printed on a coated paper by using an RI printing suitability testing machine (manufactured by Ishikawajima-Harima Heavy Industries Co., Ltd.). The ink was allowed to stay for 8 h at 23° C. under an atmosphere with a relative humidity of 65%, and a 5 cm×5 cm area of the printed portion was then evaluated by touch. The printout with no or little ink transfer was evaluated as "A", that with a large ink transfer was evaluated as "B" and that with a very large ink transfer was evaluated as "C."

<Image Uniformity>

A cyan solid image portion of each image printout was visually observed and evaluated based on the following evaluation criteria.

[Evaluation Criteria]
AA: An excellent image uniformity
A: A good image uniformity
B: An image density unevenness was partly observed.
C: An image density unevenness was observed allover the cyan solid image.

<Method for Total Evaluation>

When both the ink fixing ability and offset ink set time were evaluated as "A," the total evaluation was "AA" or "A"; when one evaluation was "A" and the other was "B", the total evaluation was "B"; and when either one or both evaluations were "C", the total evaluation was "C."

TABLE 2

| | Product name | Manufacturer | Application | Amount of transferred water (100 ms) | Amount of transferred water (400 ms) | pH of paper surface |
|---|---|---|---|---|---|---|
| Ex. 1 | Recording paper 1 | — | — | 4 | 5 | 9.1 |
| Ex. 2 | POD Gloss Coat | Oji Paper | Coated paper for electro-photography | 5.8 | 9 | 8.7 |
| Ex. 3 | UPM Digifinesee Gloss | UPM | Coated paper for electro-photography | 4.8 | 7 | 10 |
| Ex. 4 | Color Copy Gloss | International Paper | Coated paper for electro-photography | 4.8 | 7 | 8.9 |
| Ex. 5 | Avery Laser Glossy | Avery | Coated paper for electro-photography | 5.2 | 8 | 10.1 |
| Ex. 6 | Color Copy Coated Glossy | Mondi | Coated paper for electro-photography | 4.8 | 7 | 9.7 |
| Ex. 7 | Exact Gloss | Wausau Paper | Coated paper for electro-photography | 4.8 | 7 | 9.1 |
| Ex. 8 | SA Kanefuji + | Oji Paper | AO coated paper for commercial printing | 2 | 2.2 | 9.2 |
| Ex. 9 | OK Top Coat + | Oji Paper | A2 coated paper for commercial printing | 3 | 3.4 | 9.5 |
| Ex. 10 | U-light | Nippon Paper Industries | A2 coated paper for commercial printing | 3.5 | 4.1 | 9.7 |
| Ex. 11 | Neptune | Nippon Paper Industries | A2 coated paper for commercial printing | 3 | 3.4 | 9.5 |
| Ex. 12 | Aurora Coat | Nippon Paper Industries | A2 coated paper for commercial printing | 3 | 3.4 | 9.5 |
| Ex. 13 | α-Mat | Hokuetsu Paper Mills | Microcoated paper for commercial printing | 6 | 6.6 | 8.5 |
| Ex. 14 | Mirror Coat Platinum | Oji Paper | Cast coated paper for commercial printing | 0.2 | 0.3 | 8.4 |
| Ex. 15 | Espri Coat Lotus | Nippon Paper Industries | Cast coated paper for commercial printing | 0.2 | 0.3 | 9.2 |
| Ex. 16 | Espri Coat C | Nippon Paper Industries | Cast coated paper for commercial printing | 0.2 | 0.3 | 8 |
| Ex. 17 | New Mariesuto W | Hokuetsu Paper Mills | Cast coated paper for commercial printing | 0.2 | 0.3 | 8.6 |
| Ex. 18 | Picasso C | Gojo Paper Mfg. | Cast coated paper for commercial printing | 0.2 | 0.3 | 8.9 |
| Ex. 19 | Laser High Gloss | SMART Papers | Cast coated paper for commercial printing | 0.2 | 0.3 | 9.2 |
| Ex. 20 | POD Gloss Coat | Oji Paper | Coated paper for electro-photography | 5.8 | 9 | 8.7 |
| Ex. 21 | Recording paper 2 | — | — | 28 | 33 | 9.1 |
| Ex. 22 | Recording paper 1 | — | — | 4 | 5 | 9.1 |
| Ex. 23 | Recording paper 1 | — | — | 4 | 5 | 9.1 |
| Comp. Ex. 1 | Photographic paper Entry | Epson | Paper for IJ printing | 45.7 | 45.8 | 4.7 |
| Comp. Ex. 2 | Crispier | Epson | Paper for IJ printing | 45.7 | 45.8 | 3.1 |
| Comp. Ex. 3 | Recording paper 3 | — | — | 4 | 5 | 7 |
| Comp. Ex. 4 | Recording paper 4 | | | 32 | 38 | 8. |

TABLE 2-continued

| | | | | Ink fixing ability | Evaluation of fixing Ability | Offset ink setting time | Image uniformity | Total evaluation |
|---|---|---|---|---|---|---|---|---|
| Comp. Ex. 5 | Recording paper 1 | | | | | 4 | 5 | 9.1 |
| Comp. Ex. 6 | POD Gloss Coat | Oji Paper | Coated paper for electrophotography | | | 5.8 | 9.0 | 8.7 |
| | | | Ex. 1 | 0.05 | A | A | A | A |
| | | | Ex. 2 | 0.059 | B | A | AA | B |
| | | | Ex. 3 | 0.049 | A | A | A | A |
| | | | Ex. 4 | 0.057 | B | A | A | B |
| | | | Ex. 5 | 0.038 | A | A | AA | AA |
| | | | Ex. 6 | 0.04 | A | A | A | A |
| | | | Ex. 7 | 0.053 | B | A | A | B |
| | | | Ex. 8 | 0.042 | A | A | A | A |
| | | | Ex. 9 | 0.036 | A | A | A | A |
| | | | Ex. 10 | 0.04 | A | A | A | A |
| | | | Ex. 11 | 0.037 | A | A | A | A |
| | | | Ex. 12 | 0.033 | A | A | A | A |
| | | | Ex. 13 | 0.069 | B | A | A | B |
| | | | Ex. 14 | 0.029 | A | A | A | A |
| | | | Ex. 15 | 0.018 | A | A | A | A |
| | | | Ex. 16 | 0.031 | A | A | A | A |
| | | | Ex. 17 | 0.025 | A | A | A | A |
| | | | Ex. 18 | 0.03 | A | A | A | A |
| | | | Ex. 19 | 0.025 | A | A | A | A |
| | | | Ex. 20 | 0.065 | B | A | A | B |
| | | | Ex. 21 | 0.06 | B | B | B | B |
| | | | Ex. 22 | 0.05 | A | A | B | B |
| | | | Ex. 23 | 0.07 | B | B | B | B |
| | | | Comp. Ex. 1 | 0.024 | A | C | B | C |
| | | | Comp. Ex. 2 | 0.025 | A | C | B | C |
| | | | Comp. Ex. 3 | 0.085 | C | B | B | C |
| | | | Comp. Ex. 4 | 0.065 | B | C | B | C |
| | | | Comp. Ex. 5 | 0.11 | C | C | B | C |
| | | | Comp. Ex. 6 | 0.075 | C | A | C | C |

INDUSTRIAL APPLICABILITY

With the recording method in accordance with the invention, a glossy recorded image of excellent printing quality that is free from blurring, feathering, and bleeding at the peripheral portion of symbols and images and has the so-called "clear-cut edges" can be provided with a high speed by using those recording media, from among the media close to paper for general commercial printing or general commercial and publishing paper, that satisfy certain conditions, and the invention can be advantageously applied to ink recorded matter, ink-jet recording apparatus, and ink-jet recording method. Further, the printout obtained excels in resistance of images to rubbing and have excellent handleability after printing.

The ink-jet recording method in accordance with the invention can be applied to a variety or recording operations performed with an ink-jet recording system. For example, it can be especially advantageously applied to printers for ink-jet recording, facsimile devices, copiers, printer/fax/copier multipurpose machines, and printing machines.

The invention claimed is:

1. An ink jet recording method comprising:
    printing on a medium by ejecting thereon an ink that has a pH value of 8 or more and that contains at least a particulate colorant, an emulsion resin and a surfactant, the medium being prepared by providing at least one coat layer containing a pigment on at least one surface of a substrate containing cellulose pulp as a main component,
    wherein the printing is performed at a deposited ink amount of equal to or less than 15 g/m$^2$, and
    wherein the medium has a pH value of 8 or more at a paper surface, and wherein the adequacy of the medium is determined by the amount of pure water that transfers onto a surface of the medium as a coated layer after having been contacted with water at 100 ms, as measured with a dynamic scanning absorptometer, is equal to or less than 1 mL/m$^2$ and the amount of pure water that transfers onto the surface of the medium as a coated layer after having been contacted with water at 400 ms, as measured with the dynamic scanning absorptometer, is equal to or less than 35 mL/m$^2$.

2. The ink jet recording method according to claim 1, wherein at least phthalocyanine blue is the particulate colorant.

3. The ink jet recording method according to claim 1, wherein the coat layer of the medium contains at least an SBR emulsion.

4. The recording method according to claim 1, wherein the method uses a recording apparatus in which an ink repellent layer is formed on a surface of an ink jet head where openings for ink ejection are formed.

5. An ink for ink jet recording, the ink comprising at least water, a colorant, and a wetting agent, wherein the ink-jet recording method comprises:

printing on a medium by ejecting thereon an ink that has a pH value of 8 or more and that contains at least a particulate colorant, an emulsion resin and a surfactant, the medium being prepared by providing at least one coat layer containing a pigment on at least one surface of a substrate containing cellulose pulp as a main component, wherein the printing is performed so as to deposit an amount of ink equal to or less than 15 g/m$^2$, and wherein the medium has a pH value of 8 or more at a paper surface, and wherein the adequacy of the medium is determined by the amount of pure water that transfers onto a surface of the medium as a coated layer after having been contacted with water at 100 ms, as measured with a dynamic scanning absorptometer, which is equal to or less than 1 mL/m$^2$ and the amount of pure water that transfers onto the surface of the medium as a coated layer after having been contacted with water at 400 ms, as measured with the dynamic scanning absorptometer, is equal to or less than 35 mL/m$^2$.

6. The ink according to claim 5, further comprising a surfactant, wherein the surfactant is a fluorine surfactant.

7. The ink according to claim 5, wherein said ink has a viscosity at 25° C. of 1 cps to 30 cps.

8. An ink cartridge filled with the ink according to claim 5, for ink-jet recording, wherein the ink comprises at least water, a colorant, and a wetting agent, wherein the ink-jet recording method comprising:

printing on a medium by ejecting thereon an ink that has a pH value of 8 or more and that contains at least a particulate colorant, an emulsion resin and a surfactant, the medium being prepared by providing at least one coat layer containing a pigment on at least one surface of a substrate containing cellulose pulp as a main component, wherein the printing is performed so as to deposit an amount of ink equal to or less than 15 g/m$^2$, and wherein the medium has a pH value of 8 or more at a paper surface, and wherein the adequacy of the medium is determined by the amount of pure water that transfers onto a surface of the medium as a coated layer after having been contacted with water at 100 ms, as measured with a dynamic scanning absorptometer, which is equal to or less than 1 mL/m$^2$ and the amount of pure water that transfers onto the surface of the medium as a coated layer after having been contacted with water at 400 ms, as measured with the dynamic scanning absorptometer, is equal to or less than 35 mL/m$^2$.

* * * * *